United States Patent
Shanbhogue et al.

(10) Patent No.: US 12,153,665 B2
(45) Date of Patent: Nov. 26, 2024

(54) DEVICE, SYSTEM AND METHOD TO EFFICIENTLY UPDATE A SECURE ARBITRATION MODE MODULE

(71) Applicant: Intel Corporation, Santa Clara, CA (US)

(72) Inventors: Vedvyas Shanbhogue, Austin, TX (US); Baruch Chaikin, Misagv (IL)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 17/133,455

(22) Filed: Dec. 23, 2020

(65) Prior Publication Data
US 2022/0197995 A1    Jun. 23, 2022

(51) Int. Cl.
| | |
|---|---|
| *G06F 21/53* | (2013.01) |
| *G06F 9/30* | (2018.01) |
| *G06F 9/38* | (2018.01) |
| *G06F 9/445* | (2018.01) |
| *G06F 9/455* | (2018.01) |
| *G06F 9/52* | (2006.01) |

(52) U.S. Cl.
CPC .......... *G06F 21/53* (2013.01); *G06F 9/30101* (2013.01); *G06F 9/3818* (2013.01); *G06F 9/44557* (2013.01); *G06F 9/45558* (2013.01); *G06F 9/526* (2013.01); *G06F 2009/45587* (2013.01); *G06F 2221/2149* (2013.01)

(58) Field of Classification Search
CPC .... G06F 21/53; G06F 9/30101; G06F 9/3818; G06F 9/44557; G06F 9/45558; G06F 2009/45587; G06F 9/30076; G06F 9/30189; G06F 9/45533; G06F 9/30054
See application file for complete search history.

(56) References Cited

U.S. PATENT DOCUMENTS

| | | | |
|---|---|---|---|
| 2016/0364341 A1* | 12/2016 | Banginwar | G06F 9/45558 |
| 2018/0357093 A1* | 12/2018 | Cong | G06F 12/109 |
| 2019/0042780 A1* | 2/2019 | Brannock | G06F 21/6218 |
| 2019/0228145 A1 | 7/2019 | Shanbhogue et al. | |
| 2019/0311123 A1 | 10/2019 | Lal et al. | |

(Continued)

OTHER PUBLICATIONS

"Intel Trust Domain Extensions (Intel TDX)", <https://software.intel.com/content/www/us/en/develop/articles/intel-trust-domain-extensions.html> accessed Dec. 2020, 3 pgs.

(Continued)

*Primary Examiner* — Brian W Wathen
(74) *Attorney, Agent, or Firm* — Essential Patents Group, LLP

(57) ABSTRACT

Techniques and mechanisms to efficiently provide features of a secure authentication mode (SEAM) by a processor. In an embodiment, cores of the processor support an instruction set which comprises instructions to invoke the SEAM. One such core installs an authenticated code module (ACM), which is executed to load a persistent SEAM loader module (P-SEAMLDR) in a reserved region of a system memory. In turn, the P-SEAMLDR loads into the reserved region a SEAM module which facilitates trust domain extension (TDX) protections for a given trusted domain. In another embodiment, the instruction set supports a SEAM call instruction with which either of the P-SEAMLDR or the SEAM module is accessed in the reserved region.

20 Claims, 23 Drawing Sheets

(56) References Cited

U.S. PATENT DOCUMENTS

2020/0145419 A1    5/2020  Yitbarek et al.
2020/0310972 A1*  10/2020  Shanbhogue ....... G06F 9/45558

OTHER PUBLICATIONS

Extended European Search Report from European Patent Application No. 21197531.3 notified Mar. 11, 2022, 11 pgs.
Xu, Yuanzhong, et al., "Controlled-Channel Attacks: Deterministic Side Channels for Untrusted Operating Systems", 2015 IEEE Symposiums on Security and Privacy, 17 pgs.
Office Action from European Patent Application No. 21197531.3 notified Apr. 17, 2023, 8 pgs.

* cited by examiner

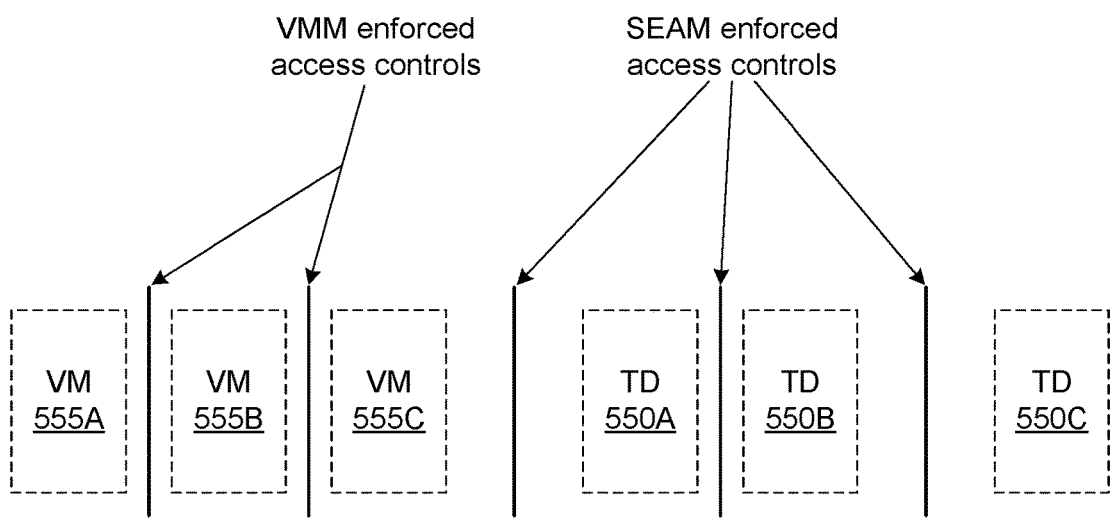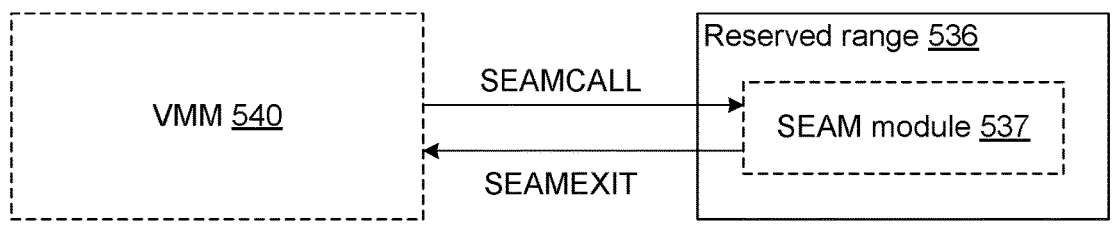
FIG. 5

```
700
P-SEAMLDR install (or update):

// P_SEAMLDR_READY is 0 at beginning of this flow
// As part of OS/VMM boot (if TDX used by OS/VMM) or on KSR/KEXEC (if P-
SEAMLDR needs to be updated)
1.    Put all package processors in WFS state (if not already in WFS state)
2.    Copy NP-SEAMLDR ACM image to physical memory
3.    Launch NP-SEAMLDR ACM using GETSEC[ENTERACCS] to install P-
      SEAMLDR
4.    If P-SEAMLDR install successful, NP-SEAMLDR sets
      P_SEAMLDR_READY = 1
5.    NP-SEAMLDR returns status of operation
      // e.g., if successful, register R9 == 0
```

FIG. 7A

```
710
SEAM module install (or update):

1.    Setup a SEAMLDR_PARAM structure
      // points to the SIGSTRUCT of the module and module image pages
2.    Invoke P-SEAMLDR to update SEAM module using
      SEAMCALL[RAX=SEAMLDR_UPDATELP] with RBX = PA of
      SEAMLDR_PARAM
      //  SEAMCALL Fails with VMFailInvalid if P_SEAMLDR_READY is not 1
      // Invoke SEAMCALL serially – one LP at a time – on all LPs
            // SEAMCALL to invoke P-SEAMLDR acquires the
            P_SEAMLDR_MUTEX
            // SEAMCALL Fails with VMFailInvalid if mutex could not be
            acquired
            // First invocation sets SEAM_READY to 0; no more SEAMCALL to
            SEAM module
            // Last invocation performs the actual update and sets the
            SEAM_READY to 1
// VMM should check status returned by SEAMLDR_UPDATELP function on all LPs to
determine if module update was successful
// On completion, the SEAM module is ready for use
```

FIG. 7B

Shutdown P-SEAMLDR                                                     720

1. Invoke P-SEAMLDR to shut it down using
   SEAMCALL[RAX=SEAMLDR_SHUTDOWNLP] function
   // SEAMCALL Fails with VMFailInvalid if P_SEAMLDR_READY is not 1
2. Invoke SEAMCALL serially on all LPs
   // SEAMCALL to invoke P-SEAMLDR and acquire the P_SEAMLDR_MUTEX
   // SEAMCALL Fails with VMFailInvalid if P_SEAMLDR_MUTEX could not be acquired
   i. P-SEAMLDR sets SEAM_READY to 0 on first call; no more SEAMCALL to SEAM module
   ii. The last SEAMCALL is invoked on the BSP in the package where the ACM to install P-SEAMLDR was run
       // Not enforced by SEAMCALL – but enforced by P-SEAMLDR and the NP-SEAMLDR ACM
       // Last call completes the sequence, and P-SEAMLDR sets P_SEAMLDR_READY to 0; no more SEAMCALL to P-SEAMLDR // After shutting down, a new P-SEAMLDR can be installed using the NP-SEAMLDR ACM

FIG. 7C

```
730
SEAMCALL Changes

// GLOBAL_TEE_DISABLE is 1 if trusted execution environments like
SGX or TDX have been globally disabled 1.    IF (RAX[63] == 0 AND SEAM_READY == 0) or
      GLOBAL_TEE_DISABLE == 1
2.    THEN VMfailInvalid;
3.    SEAM_CVP = SEAMRR_BASE + 4K + CPUID.B.0.EDX[31:0] * 4K
4.    IF RAX[63] == 1 // predict false
5.        Acquire P_SEAMLDR_MUTEX
6.        IF P_SEAMLDR_MUTEX not acquired THEN VMfailInvalid;
7.        IF P_SEAMLDR_READY == 0
8.            Release P_SEAMLDR_MUTEX
9.            VMFailInvalid
10.       inP_SEAMLDR = 1 // opens P_SEAMLDR_RR
11.       Flush all TLBs (all ASIDs) // at tail of VM exit
12.       SEAM_CVP = P_SEAMLDR_RR.BASE + 4K
13.   ENDIF
14.   << Operations adapted from POR SEAMCALL>>
```

FIG. 7D

```
740
SEAMEXIT changes:
0.    << Operations adapted from POR SEAMEXIT>>
1.    IF inP_SEAMLDR == 1 // return from SEAMLDR - predict false
2.        Flush all TLBs globally (all ASIDs, including STLB)
3.        Flush all VMCSs cached in SEAM mode // on
          implementation that support VMCS caching
4.            Release P_SEAMLDR_MUTEX
5.        inP_SEAMLDR = 0 // Close P_SEAMLDR_RR
6.    ENDIF
```

FIG. 7E

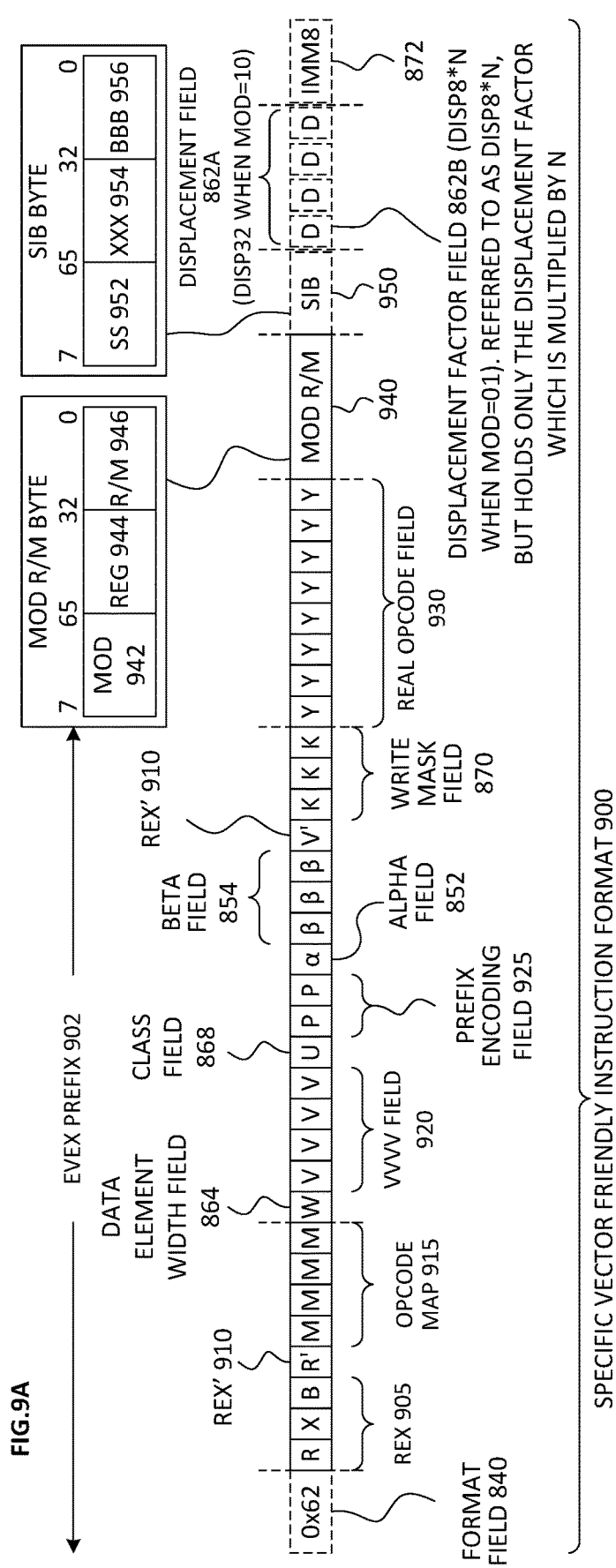
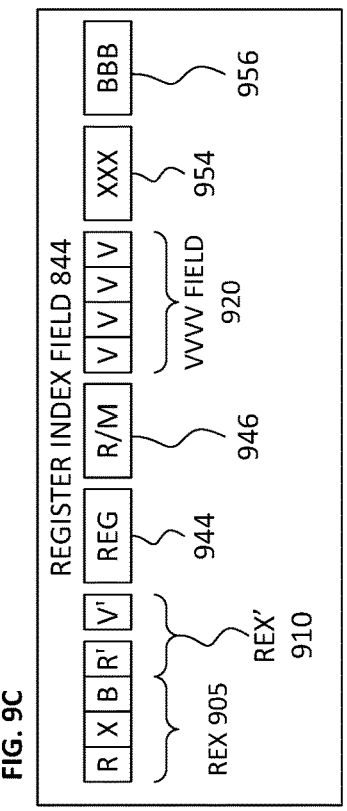
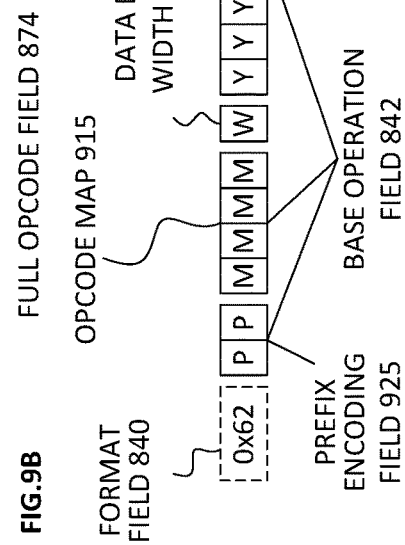

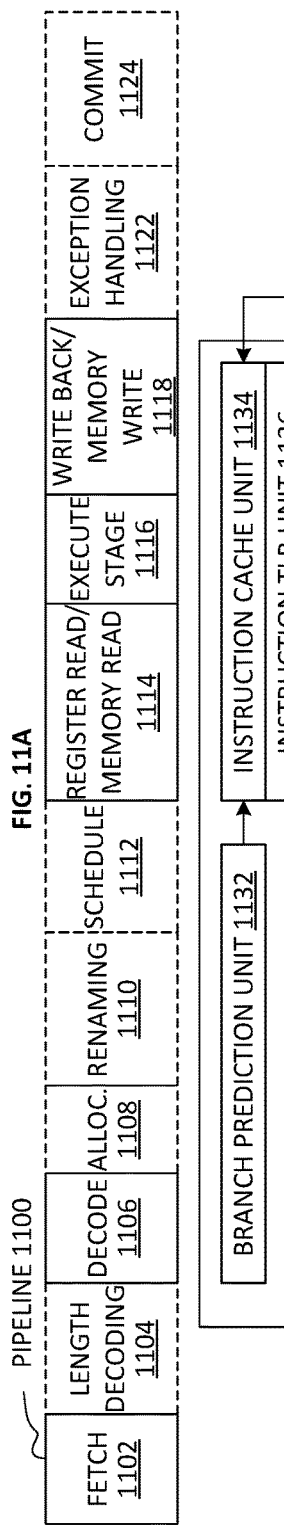

DEVICE, SYSTEM AND METHOD TO EFFICIENTLY UPDATE A SECURE ARBITRATION MODE MODULE

BACKGROUND

1. Technical Field

The disclosure pertains to computer systems and more specifically, but not exclusively, to a secure arbitration mode of a computing device to build and operate within trust domain extensions.

2. Background Art

Modern processing devices employ disk encryption to protect data at rest. However, data in memory is in plaintext and vulnerable to attacks. Attackers can use a variety of techniques including software and hardware-based bus scanning, memory scanning, hardware probing, and the like to retrieve data from memory. This data from memory could include sensitive data for example, privacy-sensitive data, IP-sensitive data, and also keys used for file encryption or communication.

The exposure of data is further exacerbated with the current trend of moving data and enterprise workloads into the cloud utilizing virtualization-based hosting services provided by cloud service providers (CSPs). CSP customers (referred to as tenants herein) are increasingly requesting better security and isolation solutions for their workloads. In particular, tenants seek solutions that enable the operation of CSP-provided software outside of a trusted computing base (TCB) of the tenant's software. The TCB of a system refers to a set of hardware, firmware, and/or software components that have an ability to influence the trust for the overall operation of the system.

To provide these protections, some CSP systems remove the virtual machine monitor (VMM), also known as a hypervisor, as well as other untrusted firmware, software, and devices from the TCB of virtual machines (VMs) that the VMM manages. The VMs are workloads of respective tenants of the CSP. From the perspective of both the CSP and the cloud tenant, both desire confidentiality for the VM workload. To achieve this confidential VM execution, the memory of the VM and the runtime processor state is kept confidential, integrity-protected, and reply protected to prevent data exfiltration or tamper-based attacks. As CSPs continue to grow in number, size, and capability, there is expected to be an increasing premium placed on improvements to the efficiency of solutions which provide secure execution environments.

BRIEF DESCRIPTION OF THE DRAWINGS

The various embodiments of the present invention are illustrated by way of example, and not by way of limitation, in the figures of the accompanying drawings and in which:

FIG. 5 is a block diagram illustrating features of a trust domain extension (TDX) implemented by a processor which facilitates operation of a SEAM module according to an embodiment.

FIGS. 7A through 7E are sequence diagrams each show respective pseudocode which illustrates operations to facilitate the provisioning of SEAM functionality according to a corresponding embodiment.

FIGS. 9A through 9D are block diagrams illustrating an exemplary specific vector friendly instruction format according to an embodiment.

FIG. 11A is a block diagram illustrating both an exemplary in-order pipeline and an exemplary register renaming, out-of-order issue/execution pipeline according to an embodiment.

FIG. 11B is a block diagram illustrating both an exemplary embodiment of an in-order architecture core and an exemplary register renaming, out-of-order issue/execution architecture core to be included in a processor according to an embodiment.

DETAILED DESCRIPTION

Figure 1A:
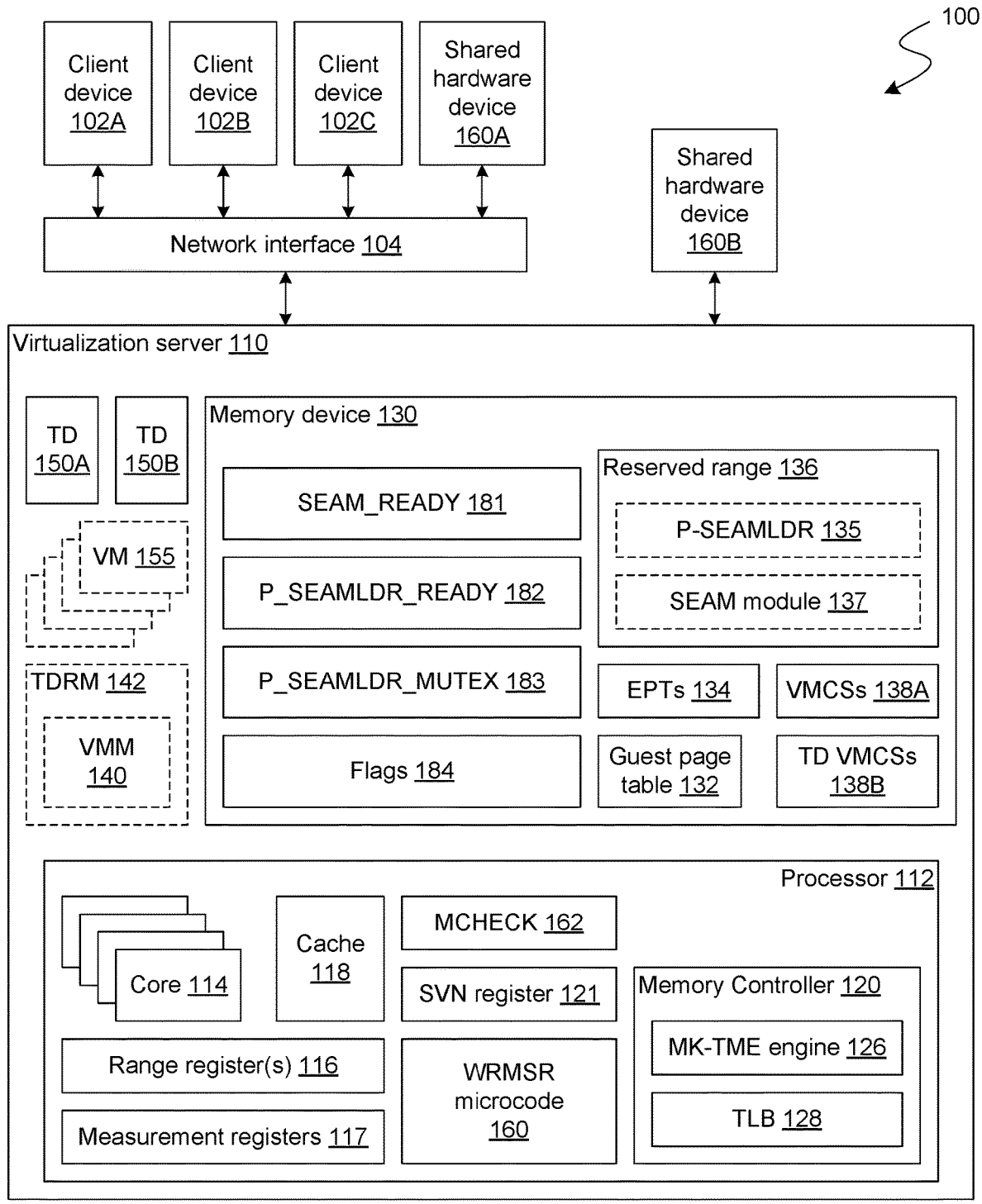
FIG. 1A is a block diagram illustrating features of a computing system comprising a processor which supports a secure arbitration mode (SEAM) extension to an instruction set architecture (ISA) according to an embodiment.

Processor architectures to provide isolation in virtualized systems using trust domains (TDs) are described. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including processor circuitry and/or computer-readable instructions to provide secure arbitration functionality.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In various embodiments, a CSP system deploys one or more trust domain extensions (TDX) to meet security objectives—e.g., via use of memory encryption and integrity provided by a memory controller adapted to include a multi-key total memory encryption (MK-TME) engine. MK-TME technology refers to providing, to an operating system or VMM, the capability to use different unique encryption keys to encrypt pages of physical memory associated with different workloads, e.g., different tenants, different applications, different devices, and the like. To support TDX, some embodiments provide or otherwise operate based on a MK-TME (or other) engine which employs specific keys that can be only used for TDX.

In some embodiments, TDX includes technology that extends virtual machine extensions (VMX) with a type of virtual machine guest referred to herein as a trust domain (TD). A TD runs in a processor mode that protects the confidentiality of its memory contents and its processor state from other software, including the hosting VMM, unless explicitly shared by the TD itself. To coordinate the above-explained protections, a trust domain resource manager (TDRM) is a VMM software extension that is deployed for management and support of TDX operation. A VMM that works as the TDRM launches and manages both TDs and "legacy" VMs. Accordingly, a VMM that works as a TDRM is a full VMM from the legacy VM perspective. In some embodiments, the TDRM is restricted with regards to the TDs that the TDRM manages as will be explained.

Secure arbitration mode (SEAM) is an instruction set architecture (ISA) extension to implement TDX. This mode (e.g., SEAM) of the processor hosts resource arbitration software (e.g., "SEAM module") that functions as a trust arbiter between the TDRM and the TDs. The SEAM module, which invokes a SEAM-specific library to execute the SEAM, manages resource assignments to the TDs. The SEAM module has access to certain privileged instructions that the SEAM can use to build the TDX from which to launch TDs. The SEAM module also manages the creation, deletion, entry/exit from TDs, and the secure use of resources assigned to the TDs (such as memory or input/output (I/O) devices). Accordingly, the TDs are secured and protected by trusting the SEAM and not the VMM (or TDRM). For example, the TDs determine whether a portion of a program is valid and is running inside of the SEAM as opposed to running outside of the SEAM.

In one embodiment, a processor deploys the SEAM module in order to enter into SEAM operation from which a TD is launched for secure execution of a tenant workload. In some embodiments, the SEAM module invokes the SEAM-specific library to support the resource management for TDs, and to be the trusted arbiter between the TDRM/VMM and the TDs. The processor includes a hardware register to store information that identifies a reserved range of memory. The reserved range of the memory stores the code and data of the SEAM module, including the SEAM-specific library. The processor further includes a processor core coupled to the hardware register.

To facilitate efficient implementation of SEAM functionality, some embodiments variously store in the reserved range of such a memory a SEAM loader module, an execution of which is to load the SEAM module into the reserved range. In turn, the SEAM loader module is itself initially loaded into the reserved range of system memory by an authenticated code module (ACM)—e.g., where such loading takes place during a system boot-up. To avoid confusion, the SEAM loader module in system memory is referred to herein as a "persistent SEAM loader" (or "P-SEAMLDR"), whereas the ACM—which is executed to load such a P-SEAMLDR in system memory—is referred to herein as a non-persistent SEAM loader (or "NP-SEAMLDR"). In providing a P-SEAMLDR in system memory—in combination with certain state variables and adaptations to SEAM instructions of an instruction set—some embodiments variously mitigate the need for processors to be in respective quiesced (e.g., wait-for-SIPI) states to enable a processor core to update the SEAM module.

In an example embodiment, an NP-SEAMLDR is launched—e.g., at boot-up—to load in system memory a P-SEAMLDR which (for example) is to persist during execution of any of various VMMs and/or other software processes. In some embodiments, a processor copies an image of the NP-SEAMLDR ACM into physical memory, and executes a get secure (GETSEC) leaf function—referred to herein as a GETSEC[ENTERACCS] instruction—to launch NP-SEAMLDR. Upon execution of the GETSEC [ENTERACCS] instruction, the processor unlocks the hardware register on the logical processor from which the NP-SEAMLDR ACM is launched, which unlocks the reserved range of the memory in which to load the P-SEAMLDR module. An ACM is a processor-authenticated firmware module that executes out of a protected environment created in the processor core caches. In some embodiments, the NP-SEAMLDR ACM is to store the P-SEAMLDR module and a manifest in the reserved range of the memory. The manifest, which is located in the header of the NP-SEAMLDR ACM, is generated via a hash algorithm run on specific information associated with the P-SEAMLDR module, e.g., a combination of the P-SEAMLDR module, a security version number (SVN) of the P-SEAMLDR module, and a P-SEAMLDR module identifier. Subsequently, the P-SEAMLDR module installs a SEAM module in the reserved range of system memory, as further detailed herein.

In some embodiments, the P-SEAMLDR creates a SEAM virtual machine control structure (VMCS) in the reserved range of memory so that the state of a VMM is able to be stored in the SEAM VMCS when a logical processor transitions to the SEAM mode. The SEAM VMCS is additionally or alternatively available to store a SEAM state that is provided to load into the logical processor for execution in the SEAM. In one such embodiment, when exiting the SEAM, a logical processor is able to use the data in such a SEAM VMCS to restore the VMM state into the processor core. In some embodiments, the NP-SEAMLDR executes in authenticated code (AC) mode and is authenticated against a manifest signature of the manifest. A key used to verify the manifest signature is embedded in hardware of the processor core. The P-SEAMLDR also uses the manifest signature to authenticate the SEAM module loaded into the reserved range of the memory. The P-SEAMLDR then records the measurements and identity of the SEAM module into a set of hardware measurement registers. In some embodiments, some or all such measurement registers are writeable only by the P-SEAMLDR, thus generating a measured environment to ensure tamper-free execution. Once the SEAM has been deployed into and set up within the reserved range of the memory, the processor core further restores a lock to the reserved range of the memory by restoring a lock to the hardware register.

Once the SEAM has been deployed via the loading process just discussed, the SEAM module has entered into SEAM VMX root mode out of which to operate TDX. The SEAM module invokes the SEAM-specific library to execute certain privileged instructions for use in building TDX from which to launch TDs. In this way, the SEAM module creates TD virtual machines (or just "TDs" for simplicity). In some embodiments, for each TD that is created by the SEAM module, the SEAM module programs various pieces of information in respective fields of a TD VMCS that the SEAM module creates for the TD. By way of illustration and not limitation, such pieces of information include a TD host key identifier (TD-HKID) and a secure extended page table (EPT) pointer (or SEC_EPTP), which is in addition to the EPT (referred to as a shared EPT herein). In some embodiments, outside of the SEAM, a VM entry does not consult some or all such pieces of information, which (for example) are specifically reserved for TDX and TD creation, so the TDRM/VMM is unaware of this additional information.

When the SEAM module performs a VM Entry, the processor uses some or all such pieces of information to enter the TD. For example, the processor (e.g., the memory controller of the processor) further translates, using the EPT to which the SEC_EPTP is directed, a guest physical address, of the first trust domain, to a host physical address of the memory. Once the SEAM module is loaded in the reserved range of the memory and operational as the SEAM, the processor, in response to execution of a SEAMCALL instruction by the VMM (or TDRM), turns virtual root mode operational control over to the SEAM as a virtual machine exit. In other words, legacy VMX root mode passes control to the SEAM VMX root mode. In SEAM VMX root mode, the SEAM module can manage the entry into and exit from the TD.

Through the TD VMCS, the SEAM module can request the processor to cause a VM exit of the TD on execution of certain instructions or occurrence of certain events and conditions. If the event triggers an unconditional exit, the VM exit transfers control from the SEAM VMX non-root mode to the SEAM VMX root-mode. In some cases, such as in response to a system interrupt, the VM exit also triggers a SEAM exit and so control is further transferred to the legacy VMX root mode.

There are many advantages to use of a SEAM module and associated supporting hardware technologies to build and operate TDX out of the SEAM. For example, the CSP (or a processor vendor, in some embodiments) implements the SEAM and differentiates software functionality in the SEAM, which is built and evolves at the speed of business needs. Furthermore, the CSPs are able to generate open source code for review, obtain certifications, implement the SEAM in a software language of choice, and the like. Use of a SEAM further enables new use models, such as use of secure enclaves out of a TD, and/or use of a VMM within a TD, which would require a number of additional ISA instructions without the SEAM.

The SEAM module that is loaded in the reserved range of the memory, in addition to operating in the SEAM-VMX-root mode, additionally uses the software and hardware protection mechanisms provided by the processor for further hardening the SEAM module. These mechanisms include, for example, execute/disable (XD), virtual memory, e.g., paging, control flow of enforcement technology (CET), protection key (PK), and the like. Similarly, the TDs that are managed and invoked by the SEAM module from SEAM VMX root mode also use these hardware protection technologies. The SEAM module ensures that the VMM/TDRM cannot hide/virtualize or in any other way prevent the use of these technologies by the TD.

In various embodiments, SEAM functionality enables platforms to further move away from hard partitioning of resources in favor of flexibly sharing platform resources. Additionally or alternatively, SEAM functionality supports sizing and/or partitioning of resources based on scaling needs, e.g., maximum number of TDs, maximum size of TDs, and the like. Additionally or alternatively, implementing a SEAM-based TDX as software reduces the complexity of the ISA compared to building the SEAM functionality into processor microcode, where hardware also evolves at a slower rate.

Some embodiments variously provide, in a protected region of a system memory, a persistent SEAM loader module which—in combination with modified SEAM instructions of an instruction—facilitate improved SEAM functionality. For example, such embodiments variously enable a SEAM module to be updated without requiring that multiple logical processors each be in a respective dormant (e.g., wait-for-SIPI) power state. Certain features of various embodiments are described with reference to implementation details for providing a SEAM according to an Intel™ processor architecture and/or instruction set. However some embodiments, which are not limited in this regard, additionally or alternatively provide corresponding improvements to SEAM functionality according to any of various other architectures and/or instruction sets.

FIG. 1A is a block diagram illustrating an example computing system 100 that includes a processor 112 that supports a secure arbitration mode (SEAM) extension of an instruction set architecture (ISA) to facilitate operation of a trust domain extension (TDX). System 100 is one example of an embodiment wherein a persistent SEAM loader (P-SEAMLDR) module, which is loaded in a reserved range of a system memory, enables the loading—and, for example, the updating—of a SEAM module in the reserved range. Such a P-SEAMLDR module in system memory facilitates an efficient updating of the SEAM module, for example.

Computing system 100 provides hardware (and, in some embodiments, executable instructions) that support operations in the SEAM. The SEAM, in turn, provides functionality to support TDX operation on a virtualization server 110 supporting (for example) one or more client devices such as the illustrative client devices 102A, 102B, and 102C shown.

As shown in FIG. 1, computing system 100 comprises a network interface 104 and shared hardware devices 160A and 160B. The virtualization server 110 includes, but is not limited to, the processor 112 and a memory device 130, e.g., memory. The processor 112 executes a virtual machine monitor (VMM) 140, which is extended with a TD resource manager (TDRM) 142. The VMM 140 controls one or more virtual machines (VMs) 155. The TDRM 142 provides resource assignments to the VMs 155 and, via the SEAM, to one or more TDs 150A, and 150B.

The memory device 130 stores, among other data and information, guest page tables 132, extended page tables (EPT) 134, VMCSs 138A associated with the one or more VMs 155 and TD VMCSs 138B associated with the one or more TD's 150A, and 150B. The memory device 130 further includes a reserved range 136 into which is loaded a SEAM loader module P-SEAMLDR 135 which, in turn, loads a SEAM module 137 in reserved range 136, as discussed herein. In an embodiment, P-SEAMLDR 135 and SEAM module 137 each include a respective one or more of a SEAM-specific library, a manifest, and other code and data associated with the SEAM for building and operating the TDs. The one or more range registers 116 include a SEAM range register (SEAMRR) which is configured with the reserved range 136 of the memory device 130, e.g., with a base address and a mask, or with a start address and an end address of the reserved range 136. The memory device 130 includes dynamic random access memory (DRAM), synchronous DRAM (SDRAM), a static memory, such as static random access memory (SRAM), a flash memory, a data storage device, or other types of memory devices. For brevity, the memory device 130 is variably referred to as "memory" herein.

In various embodiments, the processor 112 includes one or more processor cores 114, one or more range registers 116, measurement registers 117, cache 118, security version number (SVN) registers 121, a memory controller 120, write machine specific register (WRMSR) microcode 160, and memory check (MCHECK) firmware 162. The memory controller 120 further includes a MK-TME engine 126 (or other memory encryption engine) and a translation lookaside buffer (TLB) 128 that to store address translation information and/or other state of a given one of a VMM or a secure authentication mode.

In some embodiments, the MK-TME engine 126 encrypts data stored to the memory device 130 and decrypt data retrieved from the memory device 130 with appropriate encryption keys, e.g., a unique key assigned to the VM or the TD that is storing data to the memory device 130. Internally, the MK-TME engine 126 maintains an internal table used to hold keys and encryption modes (e.g., key specified, KeyID 0 (TME), and do not encrypt) which are associated with each key ID. The attributes of the table can be programmed using a processor configure (PCONFIG) instruction. In various embodiments, the SEAM module 137, once operating in SEAM VMX root mode, configures TD-specific encryption keys that the MK-TME engine 126 then employs for secure memory operations by the TDs operating out of the SEAM. Accordingly, while the MK-TME engine 126 accesses the TD-specific encryption keys, once created, they are inaccessible to the TDRM 142/VMM 140 in non-SEAM operation.

In some embodiments, the MK-TME engine 126 further provides integrity and reply protection. The strength of the integrity protection and whether the memory or processor state can be replay-protected are processor-implementation dependent. Further, to support TDX, MK-TME technology provides specific keys that can be only used for TDs. Alternately or in addition, the MK-TME technology provides a mechanism to partition the keys such that a subset of keys is reserved for use only by TDX technology.

Physical pages of the memory 130 are encrypted with one of the encryption keys managed by the MK-TME engine 126. In one embodiment, some or all such encryption keys are associated each with a respective key identifier (ID), which is added to the physical memory address of the physical page of the memory, e.g., physical memory of the host server. With the key IDs appended to the physical memory addresses, a memory transaction requested by software fails unless the memory transaction request (e.g., one of a read or write to memory) includes both the physical memory address of the page and the correct key ID for the encryption key used to encrypt/decrypt the physical page of the memory.

Each client device is (for example) one of a remote desktop computer, a tablet, a smartphone, another server, a thin/lean client, or the like. In various embodiments, some or all such client devices each execute a respective one or more applications on the virtualization server 110 in one or more of the TDs 150A, and 150B and one or more of the VMs 155, where the VMs run outside the TCB of each respective TD. In one such embodiment, other software, other than the SEAM module 137, is to also run outside the TCB of the TD. The VMM 140 executes a virtual machine environment that is to leverage hardware capabilities of a host and execute one or more guest operating systems, which support client applications that are run from the client devices 102A, 102B, and 102C, respectively.

In some embodiments, a single TD, such as the TD 150A, provides a secure execution environment to a single client 102A and supports a single guest OS. In other embodiments, one TD supports multiple tenants each running in a separate virtual machine and facilitated by a tenant VMM running inside the TD. The TDRM 142 in turn controls the TD's use of system resources, such as of the memory 130, the processor 112, and the shared hardware devices 160B. The TDRM 142 acts as a host and has control of the processor 112 and other platform hardware. A TDRM 142 assigns software in a TD (e.g., the TD 150A) with logical processor (s), but does not access a TD's execution state on the assigned logical processor(s). Similarly, the TDRM 142 assigns physical memory and I/O resources to a TD but not be privy to access/spoof the memory state of a TD due to separate encryption keys, and other integrity/replay controls on memory.

The TD 150A represents a software environment that supports a software stack that (for example) includes one or more VMMs, guest operating systems, and/or various application software hosted by the guest OS(s). The TD 150A operates independently of other TDs and uses logical processor(s), memory, and I/O assigned by the TDRM 142 and verified by the SEAM module 137 for the SEAM. Software executing in the TD 150A operates with reduced privileges so that the TDRM 142 retains control of the platform resources. On the other hand, the TDRM 142 cannot access data associated with a TD or in some other way affect the confidentiality or integrity of a TD or replay data into the TD.

More specifically, the TDRM 142 (which incorporates the VMM 140) manages the key IDs associated with the encryption keys. While the TDRM 142 allocates key IDs, the SEAM module 137 assigns keys to the TDs and programs associated key IDs for those keys into a secure VMCS. The key IDs that can be allocated for use by TDs are called private key IDs. Processor hardware enforces that the keys for the private key IDs are not configured by the VMM 140. In various embodiments, the TDRM 142 functions as a host for the TDs and has full control of the cores and other platform hardware. The TDRM 142 assigns software in a TD with logical processor(s). The TDRM 142, however, does not have access to a TD's execution state on the assigned logical processor(s). Similarly, the TDRM 142 assigns physical memory and I/O resources to the TDs, but is not privy to access the memory state of a TD due to the use of a unique private encryption key configured by the SEAM module 137 for each TD. Software executing in the TDs operates with reduced privileges so that the TDRM 142 retains control of platform resources. But, as the TDRM 142 allocates resources, the SEAM module 137 ensures policies associated with TDX execution are enforced, and in this way acts as a policy enforcer.

The VMM 140 further assigns logical processors, physical memory, encryption key IDs, I/O devices, and the like to TDs, but does not access the execution state of TDs and/or data stored in physical memory assigned to TDs. For example, the MK-TME engine 126 encrypts data and generate integrity check values before moving it from one or more range registers 116 or cache 118 to the memory 130 upon performing a "write" code. Some embodiments also include an anti-replay measure as part of generating the integrity check value. Conversely, the MK-TME engine 126 decrypts data (and verify its integrity using the associated integrity check value) when the data is moved from the memory 130 to the processor 112 following a read or write command. Some embodiments additionally check the anti-replay measures in the integrity check value.

Some embodiments variously provide a processor core (e.g., one of cores 114) with circuitry to variously execute one or more instructions based on an instruction set which supports SEAM functionality. For example, such an embodiment adapts a SEAM call (SEAMCALL) instruction for transitioning a logical processor to a secure authentication mode. Alternatively, or in addition, such an embodiment extends and/or otherwise adapts a SEAM exit (SEAMEXIT) instruction for transitioning a logical processor from a secure authentication mode—e.g., to a legacy VMM mode.

By way of illustration and not limitation, execution of a SEAMCALL instruction in one embodiment determines whether a particular one of P-SEAMLDR 135 or SEAM module 137 is to be accessed in reserved range 136. In one such embodiment, a SEAMCALL instruction includes an operand (referred to herein as a LDR-TDX operand) which identifies the particular one—and only one—of P-SEAMLDR 135 or SEAM module 137 as a target of the SEAMCALL instruction.

In various embodiments, execution of a SEAMCALL instruction or a SEAMEXIT instruction is conditioned upon, or otherwise performed with reference to, a variable SEAM_READY 181 which identifies whether a given functionality of SEAM module 137 is currently available. Alternatively, or in addition, such execution is conditioned upon or otherwise performed with reference to another variable—P_SEAMLDR READY 182—which identifies whether a given functionality of P-SEAMLDR 135 is currently available.

Alternatively, or in addition, access to P-SEAMLDR 135 on behalf of a given logical processor is predicated on an obtaining of a mutual exclusion lock—e.g., represented by the variable P_SEAMLDR_MUTEX 183—which is shared by multiple logical processors for which P-SEAMLDR 135 is conditionally made available. By way of illustration and not limitation, a value of P_SEAMLDR_MUTEX 183 at a given time indicates whether or not any next access to P-SEAMLDR 135 is to be prevented at least until a current access to P-SEAMLDR 135 (by a different logical processor) has completed. In one such embodiment, P_SEAMLDR_MUTEX 183 stores a binary flag indicating a current (un)availability of P-SEAMLDR 135, or (alternatively) stores an identifier of a logical processor—if any—for which P-SEAMLDR 135 is currently being accessed.

In some embodiments, the most recent accessing of a particular P-SEAMLDR 135 or SEAM module 137 by a given logical processor is indicated by a variable (e.g., a binary flag value) which is specific to that logical processor. By way of illustration and not limitation, flags 184 each correspond to a different respective logical processor provided by cores 114, wherein—for a given logical processor—a corresponding "inP_SEAMLDR" flag of flags 184 identifies whether P-SEAMLDR 135 is currently being accessed on behalf of that logical processor. In the example embodiment shown, SEAMREADY 181, P_SEAMLDR READY 182, P_SEAMLDR_MUTEX 183 and flags 184 as shown as being maintained in memory 130. In an alternative embodiment, some or all such variables are instead maintained (for example) in any of various suitable registers of processor 112.

Figure 1B:
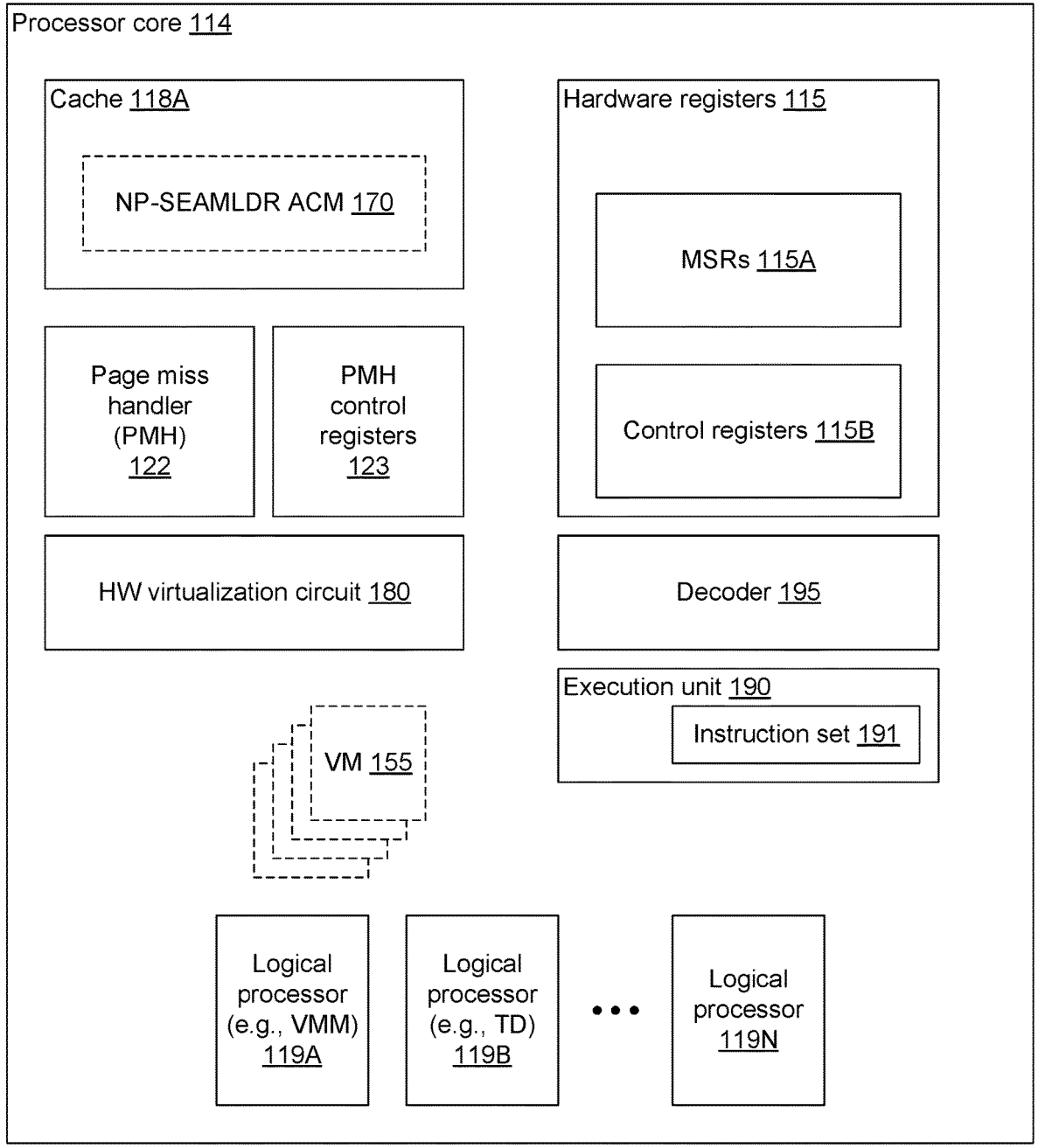
FIG. 1B is block diagram illustrating features of a processor core of a processor which supports a SEAM extension to an ISA according to an embodiment.

FIG. 1B is block diagram illustrating an example processor core of a processor of the computing system of FIG. 1A, according to one embodiment. In the embodiment illustrated in FIG. 1B, each processor core 114 includes cache 118A (e.g., one or more levels of cache), a page miss handler (PMH) 122, PMH control registers 123, a hardware virtualization support circuit 180, and hardware registers 115. The hardware registers 115 include, for example, a number of model-specific registers 115A (or MSRs) and control registers 115B (e.g., CR1, CR2, CR3, and the like). In some embodiments, when the cache 118 and the range registers 116 are referred to herein, that reference is understood to additionally or alternatively include the cache 118A and the hardware registers 116 of one or more of the processor cores 114.

In various embodiments, the cache 118A is loaded—via execution of a GETSEC[INTERACCS] instruction—with an authenticated code module NP-SEAMLDR ACM 170 which is to load P-SEAMLDR 135. This NP-SEAMLDR ACM 170 is effectively a non-persistent SEAM loader, which bootstraps a load of P-SEAMLDR 135, and associated data, into the reserved range 136 of the memory device 130, e.g., of memory. In turn, P-SEAMLDR 135 subsequently loads SEAM module 137 (and associated data) into the reserved range 136. In other embodiments, the NP-SEAMLDR ACM 170 is security logic of the processor core 114 such as logic embedded into hardware, is microcode, or is a security microcontroller embedded in the processor 112 that employs security logic, for example.

In some embodiments, the processor core 114 executes instructions to run a number of hardware threads, also known as logical processors, including the first logical processor 119A, a second logical processor 119B, and so forth, until an Nth logical processor 119N. In one embodiment, the first logical processor 119A is the VMM 140. A number of VMs 155 are executed and controlled by the VMM 140, in various embodiments.

In some embodiments, the TDRM 142 schedules a TD for execution on a logical processor of one of the processor cores 114. In addition to TDX-based client virtual machines, the virtualization server 110 executes one or more VMs 155 outside TDs for one or more client devices 102A-C. Whereas software outside trust computing base of the TDs—such as the TDRM 142 and VMM 140—may not have access to physical memory pages allocated to TDs and/or execution state of TDs, the VMs operating outside TDs are not secure against accesses by the VMM 140.

In some embodiments, the MK-TME engine 126 prevents such accesses by encrypting data moving between the processor 112 and the memory 130 with one or more shared encryption keys using the MK-TME engine 126. The term "shared" is meant to refer to a key accessible to the VMM 140, and is different from private key IDs associated with keys configured by the SEAM module 137 for assignment to TDs. In some embodiments, the PMH 122 enforces restrictions on use of private key IDs by the VMM/TDRM or VMs in the core 114. For example, the PMH 122 enforces that the key IDs that are private can be associated with read and write requests sent to the MK-TME 126 only when the logical processor executes in SEAM mode (root or non-root mode). If such restricted key IDs are used outside of the SEAM mode, then they cause a fault and the read or write transaction is aborted. The TD cannot specify which private key ID it gets to use as the key ID configured in the VMCS by the SEAM-module and the hardware uses the programmed TD-HKID when generating accesses to TD private memory. The processor 112 also restricts the PCONFIG instruction such that the private key IDs can be programmed with a key only when operating out of the SEAM module 137.

Additionally or alternatively, in various embodiments, one or more of the non-restricted keys are shared. Shared keys are accessible by two or more entities, such as TDs and VMs running outside the TDX environment. Shared keys are used to access one or more shared structures, such as shared hardware devices 160A and 160B, which are (for example) a printer, a keyboard, a mouse, a monitor, a network adapter, a router, and/or the like. In some embodiments, the MK-TME 126 encrypts data stored to memory using a shared key associated with a shared key ID. The shared key ID is used by system software including software in the SEAM as well as by devices to do direct memory access (DMA) to memory. Thus a TD can use a shared key ID to communicate with the VMM or other VMs or devices. In some cases, the TD operates to protect the confidentiality of the data transmitted to devices, for example, the data stored on a hard drive. Since the data stored to shared memory is accessible to all software, the TD software first encrypts such data using a specific key (e.g., a disk encryption key) before storing the data into memory using the shared key ID. In this way, when the VMM reads this data, it is decrypted by the shared key; however, what is decrypted is the content encrypted by the disk encryption key, so that the VMM cannot access the actual data. The TD also associates integrity check values with such encrypted data such that a subsequent attempt to tamper with that data can be detected. In one embodiment, a shared hardware device 160A is connected to the virtualization server 110 via a network interface 104. In another embodiment, a shared hardware device is local to the virtualization server 110, as illustrated, for example by the shared hardware device 160B.

The hardware virtualization support circuit 180 supports virtualized execution of operating systems, applications, and other software by the computing device 100. The hardware virtualization support circuit 180 includes virtual machine extensions (VMX) support by providing two modes of execution: VMX-root mode and VMX non-root mode. The VMX-root mode allows executing software to have broad control of the computing device 100 and its hardware resources. Conversely, the VMM 140 or host operating system (OS) executes in VMX-root mode. The VMX non-root mode restricts access to certain hardware instructions while still implementing the ordinary ring/privilege system of the processor core 114. One or more guest OSs (e.g., of the VMs) execute in the VMX non-root mode. Those guest OSs execute in ring zero, similar to being executed without virtualization. The hardware virtualization support circuit 180 also supports the EPT 134, which is embodied as hardware-assisted second-level page address translation. The hardware virtualization support circuit 180 is embodied as, for example, Intel™ VT-x technology. In some embodiments, as will be discussed with reference to FIG. 6, the SEAM VMX root mode is designed to support TDX operation, which is entered using the SEAMCALL and the SEAMEXIT instructions for a given TD as will be discussed.

Some embodiments are not limited to computer systems. Alternative embodiments of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with an embodiment.

One embodiment is described in the context of a single processing device desktop or server system, but alternative embodiments are included in a multiprocessing device system. The computing system 100 is an example of a 'hub' system architecture. The computing system 100 includes the processor 112 to process data signals. The processor 112, as one illustrative example, includes a complex instruction set computer (CISC) microprocessor device, a reduced instruction set computing (RISC) microprocessor device, a very long instruction word (VLIW) microprocessor device, a processing device implementing a combination of instruction sets, or any other processing device, such as a digital signal processing device, for example. The processor 112 is coupled to a processing device bus that transmits data signals between the processor 112 and other components in the computing system 100, such as the memory device 130 and/or secondary storage 118, storing instruction, data, or any combination thereof. The other components of the computing system 100 include a graphics accelerator, a memory controller hub, an I/O controller hub, a wireless transceiver, a Flash basic input/output system (BIOS), a network controller, an audio controller, a serial expansion port, an I/O controller, etc.

To facilitate efficient SEAM functionality—e.g., including supporting an update to SEAM module 137 while one or more logical processors remain in respective power states—some embodiments variously provide an adapted flow for executing a SEAMCALL instruction to access P-SEAMLDR 135 in reserved range 136. For example, a decoder 195 of processor core 114 comprises circuitry to decode a SEAMCALL instruction which is based on an instruction set 191. An execution unit 190 of processor core 114 comprises circuitry to variously execute one or more decoded instructions which are based on (e.g., according to or otherwise compatible with) an instruction set 191 according to an embodiment. By way of illustration and not limitation, instruction set 191 supports a SEAMCALL instruction to access a specified one of a persistent SEAM loader module or a SEAM module—e.g., either of P-SEAMLDR 135 or SEAM module 137—which (for example) are both loaded in a reserved range of system memory. Alternatively or in addition, instruction set 191 supports a SEAMEXIT instruction to exit a logical processor from a secure authentication mode. In one example embodiment, instruction set 191 comprises one or more instructions, the execution of which is predicated or otherwise based on an accessing of SEAM_READY 181, P_SEAMLDR READY 182, P_SEAMLDR_MUTEX 183 and/or flags 184.

Figure 2:
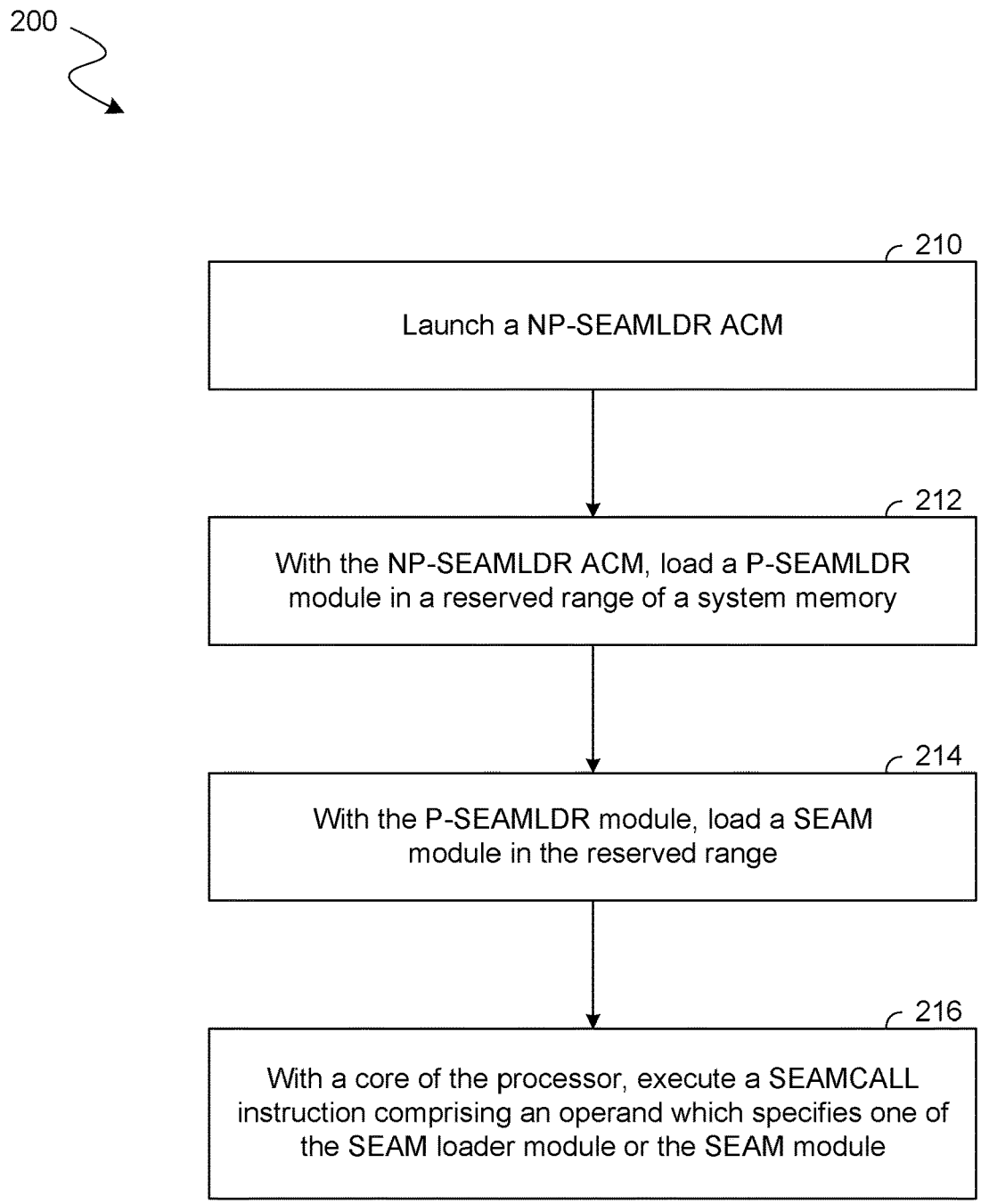
FIG. 2 is a flow diagram illustrating features of a method to provide SEAM functionality according to an embodiment.

FIG. 2 illustrates features of a method 200 to provide secure authentication functionality with a SEAM loader module in a system memory according to an embodiment. Method 200 is performed, for example, with circuitry which provides some or all of the functionality of virtualization server 110.

As shown in FIG. 2, method 200 comprises (at 210) launching a non-persistent SEAM loader (NP-SEAMLDR) ACM at the processor—e.g., during a boot-up of system 100. With the NP-SEAMLDR ACM launched at 210, method 200 (at 212) loads a persistent SEAM loader module P-SEAMLDR in a reserved range of a memory which is coupled to the processor. In an embodiment, a range register of the processor (e.g., a register SEAMRR of the one or more range registers 116) stores information that identifies the reserved range. Method 200 further comprises (at 214) the P-SEAMLDR module loading, in the reserved range of the memory, a SEAM module (e.g., SEAM module 137) which provides functionality to implement a secured authentication mode of a logical processor.

After the loading at 212 and at 214, method 200 (at 216) executes, with a core of the processor, a SEAMCALL instruction which is based on an instruction set. In one such embodiment, the SEAMCALL instruction (a format of which is, for example, according to a SEAMCALL instruction type in the instruction set 191) comprises an opcode which indicates that a logical processor—which provides the SEAMCALL instruction—is to transition from a legacy VMX root operation to a SEAM VMX root operation. The SEAMCALL instruction further comprises an operand—referred to herein as a LDR-TDX operand—which specifies one (and only one) of the SEAM loader module, or the SEAM module. By way of illustration, the LDR-TDX operand is communicated in bit RAX[63] of a general purpose register RAX—e.g., wherein RAX[63] being equal to one ("1") indicates that the SEAMCALL instruction is to target P-SEAMLDR, whereas RAX[63] being equal to zero ("0") indicates that the SEAMCALL instruction is to target the SEAM module.

Executing the SEAMCALL instruction at 216 comprises determining whether the one of the SEAM loader module or the SEAM module, as specified by the LDR-TDX operand, is to be accessed. In one such embodiment, such determining comprises determining, with the executing SEAMCALL flow, whether to signal a failure of the SEAMCALL instruction based, for example, on SEAM_READY 181, P_SEAMLDR_READY 182 and/or one or more other such variables. In one such embodiment, the SEAMCALL flow determines whether the LDR-TDX operand specifies the SEAM module while SEAM_READY 181 identifies an availability of the SEAM module. Additionally or alternatively, executing the SEAMCALL instruction at 216 comprises (for example) invoking an execution of P-SEAMLDR to write to the measurement registers a measurement of the SEAM module.

In various embodiments, the P-SEAMLDR and the SEAM module both execute in SEAM modes and are variously invoked each by a respective SEAMCALL instruction. However, for the logical processor (LP) which provides a given SEAMCALL instruction, setting the inP_SEAMLDR flag which corresponds to that logical processor to "1" (or some other value which indicates invocation of the P-SEAMLDR) unlocks one or more instructions for use by the P-SEAMLDR only on that logical processor. In an embodiment, the one or more unlocked instruction enable the P-SEAMLDR to write to one or more measurement registers (such as measurement registers 117)—e.g., to store a measurement of the SEAM module. Accordingly, some embodiments enable selective access to measurement registers on a LP-specific basis, wherein a SEAMCALL instruction is provided by a first LP of multiple LPs, wherein, of the multiple LPs, a first inP_SEAMLDR flag corresponds to only the first LP, wherein the first variable is to indicate that, of the P_SEAMLDR and the SEAM module, the P_SEAMLDR is more recently invoked by the first LP, and wherein an ability of the P_SEAMLDR to access the measurement registers is based on the first inP_SEAMLDR flag.

Additionally, or alternatively, determining whether to access the one of the SEAM loader module or the SEAM module comprises executing the SEAMCALL flow to determine whether a mutual exclusion lock (such as that indicated by P_SEAMLDR_MUTEX 183) has been obtained. In some embodiments, the SEAMCALL instruction is provided by a first logical processor of multiple logical processors which each correspond to a different respective inP_SEAMLDR flag of the flags 184. In one such embodiment, the executing SEAMCALL flow sets the particular inP_SEAMLDR flag which corresponds to the first logical processor—the setting based on a determination that the LDR-TDX operand specifies the P-SEAMLDR—to indicate that, of P-SEAMLDR and the SEAM module, the SEAM loader module is more recently invoked by the first logical processor. Although some embodiments are not limited in this regard, method 200 further comprises (for example) the core executing a SEAM retirement (SEAMRET) instruction based on the instruction set. In an embodiment, execution of a SEAMRET flow determines—e.g., based on the corresponding inP_SEAMLDR flag, whether to flush data from TLB 128, VMCSs 138A, TD VMCSs 138B and/or the like.

Figure 3:
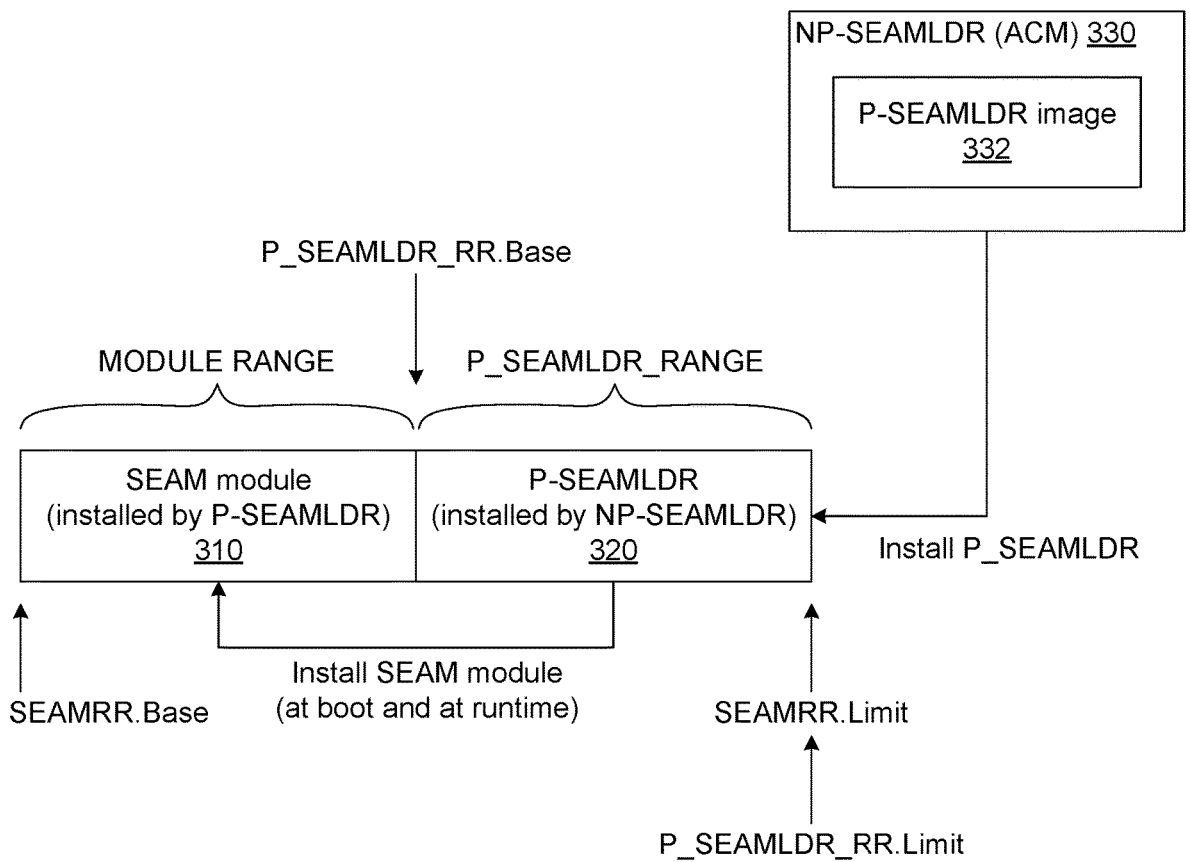
FIG. 3 is a data diagram illustrating operations to provide a persistent loader of a SEAM module according to an embodiment.

FIG. 3 shows features of a system 300 to provide a persistent SEAM loader at a reserved region of system memory according to an embodiment. In an embodiment, system 300 includes features of system 100—e.g., wherein some or all operations of method 200 are performed with system 300.

As shown in FIG. 3, a reserved region of system memory (e.g., reserved region 136) is defined as extending from a base address SEAMRR.Base to another address SEAMRR.Limit—e.g., wherein SEAMRR.Base and SEAMRR.Limit are identified in a range register (SEAMRR) provided, for example, with the one or more range registers 116. In one such embodiment, the range register SEAMRR specifies or otherwise indicates two subranges MODULE RANGE, P_SEAMLDR_RANGE of the reserved memory range—e.g., where MODULE RANGE is to store a SEAM module 310, and where P_SEAMLDR_RANGE is to store a persistent SEAM loader module P-SEAMLDR 320. For example, P_SEAMLDR_RANGE is defined as extending from a base address P_SEAMLDR_RR.Base to another address P_SEAMLDR_RR.Limit—e.g., where P_SEAMLDR_RR.Limit is the same as SEAM_RR.Limit.

In one such embodiment, during a platform boot-up, a processor copies the NP-SEAMLDR ACM 330 into physical memory, and (for example) executes a GETSEC[ENTERACCS] instruction to launch NP-SEAMLDR ACM 330. Execution of NP-SEAMLDR ACM 330 retrieves or otherwise accesses a P-SEAMLDR image 332, which is then installed in P_SEAMLDR_RANGE. After such installation in P_SEAMLDR_RANGE, P-SEAMLDR 320 is subsequently executed (e.g., during boot-up or, alternatively, during runtime) to install SEAM module 310 in MODULE RANGE. As a result, SEAM module 310 and P-SEAMLDR 320 are each available in the reserved memory region to be selectively accessed by the execution of a SEAMCALL instruction according to an embodiment.

Figure 4:
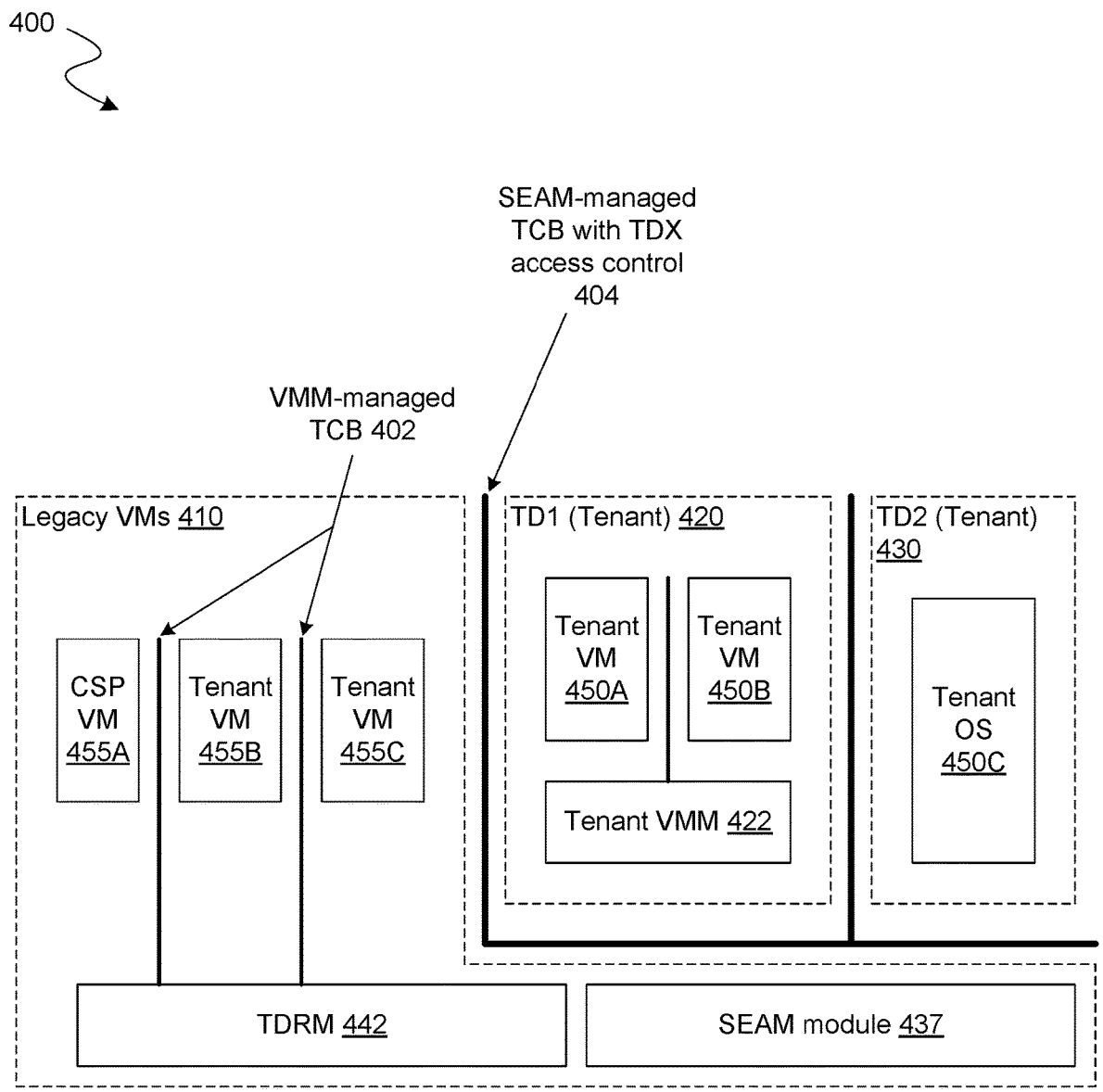
FIG. 4 is a block diagram illustrating features of a computing system to provide virtual machine monitor (VMM) management of trust control boundaries according to an embodiment.

FIG. 4 is a block diagram illustrating an example computing system 400 to implement virtual machine monitor (VMM) management of trust control boundaries with TDX access control according to some embodiments. In various embodiments, the TDRM 442 (which, for example, includes the VMM 140) executing on the computing system 400 supports legacy VMs 410, e.g., a CSP VM 455A, a first tenant VM 455B, and a second tenant VM 455C. These legacy VMs still leverage memory encryption via TME or MK-TME in this model. A VMM-managed TCB 402 is provided for CSP VM 455A, and tenant VMs 455B, VM 455C.

The TDRM 442, as verified and enforced by a SEAM module 437 (e.g., SEAM module 137), further supports two TDs—i.e., a TD1 420 and a TD2 430—both of which are implemented where the TD is a tenant that does not trust the CSP (e.g., the virtualization server 110) to enforce confidentiality. Accordingly, the TD1 420 and TD2 430 rely on execution of the SEAM out of the reserved range of the memory (e.g., reserved range 136) to implement TDX, which provides the confidentiality and protection of the TDs. The TD1 420 is shown with a virtualization mode (such as VMX) being utilized by the tenant VMM (non-root) 422 running in TD1 420 to manage tenant VMs 450A, 450B. The TD2 430 does not include software using a virtualization mode, but instead runs an enlightened OS 450C in the TD3 430 directly. TD1 420 and TD2 430 are tenant TDs having a SEAM-managed TCB with TDX access control 404 as described herein. In one embodiment, TD1 420 or TD2 430 is the same as any of the TDs 150A, or 150B described with respect to FIG. 1A.

The TDRM 442 and the SEAM modules 437 manage the life cycle of the VMs and TDs including allocation of resources. However, the TDRM 442 is not in the TCB for TD types TD1 420 and TD1 430. The processor (e.g., processor 112) does not place any architectural restrictions on the number or mix of TDs active on a system. However, software and certain hardware limitations in a specific implementation limit the number of TDs running concurrently on a system due to other constraints.

FIG. 5 is a block diagram illustrating a system 500 to provide components of a TDX implemented by a processor which is supported with a SEAM module 537 (such as SEAM module 137), according to one embodiment. In this embodiment, the VMM 540 enforces access controls between the VMs 555A, 555B, and 555C. To enter the secure arbitration mode (SEAM) that is to implement TDX, the SEAM module 537 is stored in (e.g., loaded into) the reserved range 536 of the memory in addition to other supporting data and information. Before loading the SEAM module 537 into the reserved range 536 of the memory, the processor sets up memory encryption for the reserved range using a platform-reserve encryption key for encrypting the SEAM-reserved memory range. The memory controller (e.g., memory controller 120) encrypts the SEAM module, using the platform-reserved encryption key, before the SEAM module 537 is stored into the reserved range 536 of the memory. The memory controller further encrypts and integrity protects, using the platform-reserved encryption key, data stored in and retrieved from the reserved range 536 of the memory, e.g., other data associated with the SEAM such as page tables, a VMCS per logical processor.

In some embodiments, the SEAM module 537 facilitates the implementation of TDX to launch and control access to the one or more TDs 550A, 550B, and 550C. The SEAM module 537 instantiates as many TDs for which the TDRM and the SEAM module have resources to support. The VMM 540 invokes the SEAMCALL instruction to request to enter the SEAM. The SEAM module 537 later invokes the SEAMEXIT instruction to exit the SEAM and turn root mode operational control back over to the VMM 540. The particulars of the SEAMCALL and the SEAMEXIT instructions will be described in more detail with reference to FIGS. 7A-7E.

Figure 6:
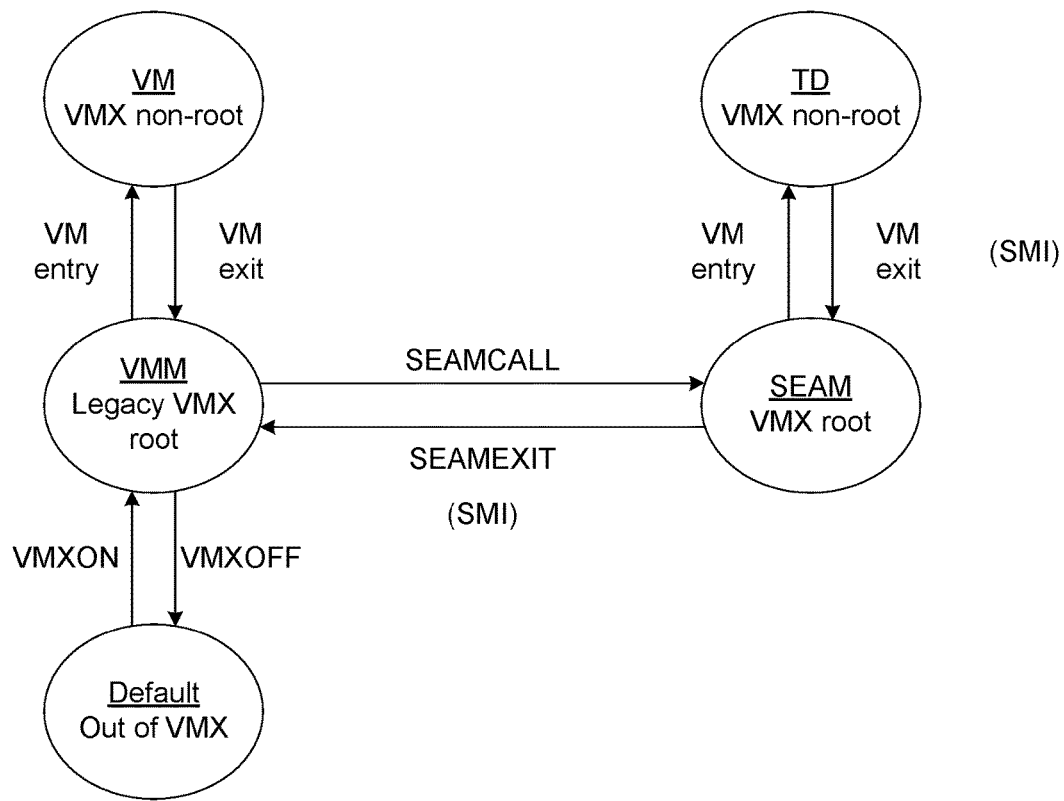
FIG. 6 is a flow diagram illustrating features of a state machine comprising virtual machine extensions (VMX) and SEAM-based TDX transitions, according to an embodiment.

FIG. 6 is a flow diagram illustrating virtual machine extensions (VMX) and SEAM-based TDX transitions 600, according to some embodiments. As discussed, the SEAM is an extension to virtual machines extension architecture to define a new VMX root mode called SEAM VMX root mode, to distinguish it from legacy VMX root mode. This SEAM VMX-root mode is used to host a processor-attested module (e.g., the SEAM module 137) to create virtual machine (VM) guests called TDs. More particularly, VMs launched or resumed from SEAM VMX-root mode are TDs and VMs launched or resumed from legacy VMX-root mode are legacy VMs. The launching or resuming of a VM or a TD is performed with a VM entry and exiting out of the VM or TD is performed with a VM exit. One of the reasons to exit out of the TD to the SEAM VMX root mode is in response to detecting a system management interrupt (SMI). The partitions (see FIG. 5) between the TDs are implemented by the SEAM using VMX hardware extensions like EPT and the like.

In some embodiments, the TD runs in the processor SEAM VMX non-root mode to protect the confidentiality of memory contents and processor state of the TD from other software (other than the SEAM module 137 executing out of the reserved range 136 of the memory), including the hosting VMM, unless explicitly shared by the TD itself. The software executing in SEAM VMX-root mode provides arbitration of resources between the TD and the VMM/TDRM. In many embodiments, the code size of the software in SEAM VMX root mode (SEAM library) is substantially smaller than the code size of the untrusted VMM.

In one embodiment, and with continued reference to FIGS. 1A, 1B, the SEAM module 137 executes out of the reserved range 136 of memory specified using one of the range registers 116, e.g., a SEAM range register (SEAMRR) that is configured by the CSP. The reserved range 136 is programmed by the BIOS (not illustrated in FIG. 1A) and verified by the MCHECK firmware 162. Since the BIOS is not trusted to configure the SEAMRR correctly, in embodiments, the processor 112 provides a processor-authenticated firmware module called MCHECK. In embodiments, the BIOS is to invoke the MCHECK firmware 162 to activate the SEAMRR range that it configured into the SEAMRR range registers. The processor executes the MCHECK firmware 162 out of a protected environment created in the caches 118A of the processor core(s) 114 such that the MCHECK execution cannot be tampered with by untrusted software and other devices in the platform. Extending MCHECK functionality to cover this validation ensures the range register 116 has been programmed identically on the processor cores 114 and that values for the reserved range 136 of the memory stored in the range register 116 has not been configured to overlap with specific memories reserved for devices or other special memories like Trusted Execution Technology (TXT) memory ranges (since such special memory ranges are not protected by the MK-TME). The MCHECK firmware 162 further configures a platform-reserved encryption key of the MK-TME engine 126 used to encrypt, and to integrity and replay protect, data stored to the reserved range of the memory.

The SEAM module 137 is software stored to the reserved range 136 programmed with the range register 116. In one embodiment, the NP-SEAMLDER ACM 170 (FIG. 1B), or other security logic, is executed in order to load P-SEAMLDR 135 into the reserved range 136 of the memory (where P-SEAMLDR 135, in turn, loads SEAM module 137 into the reserved range 136 of the memory). Accordingly, the NP-SEAMLDER ACM 170 functions, and is referred to, as a non-persistent SEAM loader that, for example, does not persist after P-SEAMLDR 135 has been loaded into (and remains available from) reserved range 136. An ACM is a processor-authenticated firmware module that, for example, executes out of a protected environment created in the caches 118A of the processor core(s) 114. ACM technology was introduced as part of Intel™ Trusted Execution Technology (TXT). The NP-SEAMLDER ACM 170 is launched using the GETSEC[ENTERACCS] instruction, for example. The MCHECK firmware 162 tells hardware that the reserved range 136 of memory is verified and can be used by the P-SEAMLDR 135 and the SEAM module 137. In one embodiment, P-SEAMLDR 135 copies the SEAM module 137 and a manifest into the reserved range 136 of the memory. The P-SEAMLDR 135 then verifies the manifest (e.g., a message digest of the SEAM module and loadable components, a security version number (SVN), and other such information) associated with the SEAM module.

In various embodiments, the processor transitions from legacy VMX-root mode to SEAM VMX-root mode in response to a SEAMCALL instruction invoked by the untrusted VMM (or TDRM). This transition is similar to a parallel VM exit to perform peer monitoring in response to a VMCALL from the VMM. The processor transitions out of SEAM VMX root mode to legacy VMX root mode in response to the SEAMEXIT instruction. This transition is similar to a parallel VM entry from peer monitor to legacy VMX root mode in response to a VMRESUME from the peer monitor. Peer monitor is also called SMM transfer monitor (STM) and is part of the Intel™. VTx.

With additional reference to FIG. 6, keeping the execution within the legacy VMX root mode separate from execution within the SEAM VMX root mode ensures that sensitive data and measurements generated in SEAM operation is not visible or accessible to the VMM or other legacy VMs. The system management mode (SMM) of the processor 112 allows selection, e.g., opt in and opt out options to VMX architecture, and has access to hardware registers of the processor 112.

In one embodiment, assume that a first logical processor is operating within the SEAM VMX non-root mode in a first TD. Assume the first TD detects a system management interrupt (SMI). In this situation, the first TD performs a VM exit to the SEAM VMX root mode. The SEAM VMX root mode then securely stores secrets and confidential data of the first TD from hardware registers of the processor 112 back to the memory device 130, e.g., in encrypted form using a host key ID (HKID). The actual encryption and storing to memory are performed by the MK-TME 126. The SEAM module 137 then clears out the secrets thus saved from processor register states such that no TD state leaks out. The VMX root mode then executes the SEAMEXIT instruction to exit out of the SEAM VMX root mode and transfer virtual root operational control (e.g., VMX root mode control) of the logical processor back over to the legacy VMX root mode, e.g., in the VMM 155.

In some embodiments, the SMI is masked when in SEAM VMX root mode such that even though the pendency of the SMI pending in the SEAM VMX non-root mode causes the VM exit, the SMI itself remains pending because it is masked in SEAM VMX root mode. Once in legacy VMX root mode, the SMI can actually be handled and causes a transition to the system management mode (SMM) or causes a SMI VM-exit to the SMM. Once in SMM, the SMM can read the register contents of the processor. The SMM, however, cannot see any TD or SEAM module secrets since such secrets have been removed by the SEAM module before performing the SEAMEXIT to the legacy VMX root mode. Thus the SMM sees the state of the processor as exists in the legacy VMX root mode With continued reference to FIGS. 1A, 1B, and 6, the reserved range 136 of the memory device 130 for the SEAM library is allocated by BIOS and programmed into the range register 116 (e.g., SEAMRR) using MSRs. Accesses to the reserved range 136 of the memory, when not in the SEAM, triggers an abort page redirection. When in SEAM VMX root mode, the reserved range 136 provides memory type to the access as a write back (WB) if register CR0.CD=0 and as uncacheable (UC) if register CR0.CD=1. Since the memory type of the SEAM reserved range cannot be tampered by the VMM, the memory type protects the SEAM module 137 from attacks by the VMM through configuring unexpected memory types for this range like configuring this range to be write-combining.

In various embodiments, the WRMSR microcode 160 enforces that the reserved range 136 of the memory is configured as a contiguous range and is not programmed to overlap with memory ranges reserved for specific uses or special devices, e.g., system management range register (SMRR), SMRR2, processor reserved memory range registers (PRMRR) or IA32_APIC_BASE. Attempting to write to the reserve range base address or mask is to cause such an overlap causes a general protection fault (#GP(0) fault). Similarly, attempting to program the PRMRR, SMRR, SMRR2, or IA32_APIC_BASE to overlap with the reserved range 136 region is to cause a general protection fault. Protected ranges are defined by the base address plus a mask added to the base address. The reserved range 136 of the memory is also specified by a start address and an end address.

In some embodiments, the BIOS allocates the base address and the mask defining the reserved range 136 of the memory and sets the lock bit on the range register 116, associated with this reserved range 136 of the memory, of each processor core 114. An uncore copy is maintained for the range register 116 and is updated by the WRMSR microcode 160.

In various embodiments, the MCHECK firmware 162 is a trusted module that is embedded in a microcode patch and is launched by a microcode patch load to validate processor-protected range registers and their configuration. This module is used to validate security guard extensions (SGX) memory configuration. The MCHECK firmware 162 is extended to validate the SEAM range registers 116. The MCHECK firmware validates the configuration of the reserved range 136 stored with the SEAM range register 116 (e.g., SEAMRR) similarly as it does with the PRMRR (enforces identical rules about configuration like overlaps with memory-mapped I/O (MMIO) and the like. The MCHECK firmware 162 further requires that the MK-TME engine 126 on the platform is configured with integrity enabled as a pre-requisite to marking the SEAMRR as valid. The MCHECK firmware makes PRMRR being valid as a precondition to marking SEAMRR as valid.

In one embodiment, the physical memory range programmed into the SEAM range register 116 (e.g., SEAMRR) is to have a key ID of zero ("0"), which is enforced by the MCHECK firmware 162. The ephemeral key used for SEAMRR accesses is not the same as the key addressed by key ID zero by the VMM for legacy VMs. Instead, accesses to the reserved range 136 of the memory are encrypted and integrity protected using a platform-reserved encryption key that is also used for encryption and integrity protection of the reserved range stored in the PRMRR. This platform-reserved encryption key is programmed into the MK-TME engine 126 by the MCHECK firmware 162. This platform key is randomly regenerated on every boot. So, even if an attacker were to capture encrypted memory of the computing system 100, the attacker would not be able to inject into range on a subsequent power up.

FIGS. 7A through 7E show various examples of pseudocode illustrating respective algorithms to facilitate SEAM functionality each according to a corresponding embodiment. In various embodiments, some or all such algorithms variously provide, use or otherwise operate based on a P-SEAMLDR which is installed in a system memory by a NP-SEAMLDR. Additionally or alternatively, some or all such algorithms are variously implemented based on one or more of the variables SEAM_READY, P_SEAMLDR_READY, inPSEAMLDR described herein. In some embodiments, some or all such algorithms use a mutual exclusion lock P_SEAMLDR_MUTEX which is shared to control access to a P-SEAMLDR by any of various logical processors. Based on such algorithms (and supporting circuitry, data structures, and the like), some embodiments variously enable a type of indirection in the provisioning of SEAM loader functionality. This indirection facilitates the updating of a SEAM module without requiring that all logical processors, for which the SEAM module is made conditionally available, be in a dormant state (such as a wait-for-SIPI state).

For example, FIG. 7A shows pseudocode 700 representing the functionality of executed instructions and/or any of various other suitable hardware logic and/or software logic to install (or update) a persistent SEAM loader module P-SEAMLDR according to an embodiment. An algorithm such as that illustrated by pseudocode 700 provides, and/or is performed with, functionality of NP-SEAMLDR ACM 170 (for example)—e.g., wherein one or more operations of method 200 include or are otherwise based on said algorithm.

As shown in FIG. 7A, installing of a P-SEAMLDR is performed (for example) as part of the execution—e.g., at boot-up—of an operating system (OS) and, in some embodiments, of a voltage machine monitor (VMM) supported by the OS. In some embodiments, P-SEAMLDR installation is conditioned upon one or more application processors (and/or other processors) each being in a wait-for-SIPI (WFS) state.

As indicated in line 2 of pseudocode 700, an image of a non-persistent SEAM loader (NP-SEAMLDR) ACM is copied to physical memory. Subsequently (see line 3 of pseudocode 700), the NP-SEAMLDR ACM is launched—e.g., using a GETSEC[ENTERACCS] instruction—to unlock a reserved range of the memory, and to install a persistent SEAM loader module P-SEAMLDR in said reserved range. Where the installation is successful (see line 4 of pseudocode 700), a variable P_SEAMLDR_READY is set to a value (e.g., 1) which indicates an availability of P-SEAMLDR to be accessed (for example) by an execution of a SEAMCALL instruction. As indicated in line 5 of pseudocode 700, the NP-SEAMLDR returns—in one or more registers (such as the illustrative register R9 shown)—information which describes a result of the GETSEC[ENTERACCS] instruction.

FIG. 7B shows pseudocode 710 representing the functionality of software instructions, an execution engine, and/or any of various other suitable hardware logic and/or software logic to install (or update) a SEAM module according to an embodiment. An algorithm such as that illustrated by pseudocode 710 provides, and/or is performed with, functionality of P-SEAMLDR 135—e.g., wherein one or more operations of method 200 include or are otherwise based on said algorithm.

As indicated in line 1 of pseudocode 710, installing a SEAM module in one embodiment comprises setting up a SEAMLDR_PARAM structure which points to a signature structure (or enclave certificate) SIGSTRUCT for the SEAM module and associated data. The P-SEAMLDR is then invoked (see line 2 of pseudocode 710) with a SEAMCALL instruction which provides an address of the SEAMLDR_PARAM structure. The invoked P-SEAMLDR installs (or alternatively, updates) the SEAM module in the reserved region of system memory.

In some embodiments, updating the SEAM module is performed by multiple logical processors invoking respective SEAMCALL instructions serially—e.g., wherein a mutual exclusion lock P_SEAMLDR_MUTEX limits access to the P-SEAMLDR to only one logical processor at a time. In one such embodiment, a first one of said serial invocations sets the variable SEAM_READY to indicate an unavailability of the SEAM module. Additionally or alternatively, a last one of said serial invocations—i.e., an invocation which is to actually perform an update to the SEAM module—sets the variable SEAM_READY to indicate an availability of the (now updated) SEAM module FIG. 7C shows pseudocode 720 representing the functionality of software instructions, an execution engine, and/or any of various other suitable hardware logic and/or software logic to shut down a persistent SEAM loader module P-SEAMLDR according to an embodiment. An algorithm such as that illustrated by pseudocode 720 is performed, for example, with circuitry such as that of execution unit 190—e.g., wherein one or more operations of method 200 include or are otherwise based on said algorithm.

As indicated in line 1 of pseudocode 720 P-SEAMLDR is invoked with a SEAMCALL instruction which provides an operand to indicate that the P-SEAMLDR is to be shut down. The SEAMCALL instruction fails if the variable P_SEAMLDR_READY indicates that P-SEAMLDR is unavailable. In some embodiments (see line 2 of pseudocode 720), shutting down P-SEAMLDR is performed by multiple logical processors invoking respective SEAMCALL instructions serially—e.g., wherein a mutual exclusion lock P_SEAMLDR_MUTEX limits access to the P-SEAMLDR to only one logical processor at a time. As indicated in line 2(i) of pseudocode 720, a first one of said serial invocations sets the variable SEAM_READY to indicate an unavailability of the SEAM module. Additionally or alternatively (see line 2(ii) of pseudocode 720), a last one of said serial invocations—performed by the processor (e.g., a bootstrap processor) which loaded the NP-SEAMLDR ACM for installing P-SEAMLDR—sets the variable P_SEAMLDR_READY to indicate an unavailability of P-SEAMLDR FIG. 7D shows pseudocode 730 representing the functionality of an execution engine and/or any of various other suitable hardware logic and/or software logic to execute a SEAMCALL instruction according to an embodiment. An algorithm such as that illustrated by pseudocode 730 is performed, for example, with execution unit 190.

As shown in FIG. 7D, determining whether the SEAMCALL instruction is to fail is based on an evaluation (in line 2 of pseudocode 730) of whether an availability of the SEAM module—as specified by a value of the SEAM_READY variable—coincides with the SEAM module being specified by a LDR-TDX operand (in RAX[63]). Additionally or alternatively, such determining is based on an evaluation (see line 2 of pseudocode 730) of whether the LDR-TDX operand specifies P-SEAMLDR, and if so, whether (as indicated by lines 6 and 7 of pseudocode 730) a mutual exclusion lock P_SEAMLDR_MUTEX for P-SEAMLDR can be obtained. Where it is determined that SEAMCALL execution is to access the P-SEAMLDR, an inP_SEAMLDR flag (for the logical processor which provided the SEAMCALL instruction) is set, and one or more TLBs, VMCSs and/or other data structures are flushed.

FIG. 7E shows pseudocode 740 representing the functionality of an execution engine and/or any of various other suitable hardware logic and/or software logic to execute a SEAMEXIT instruction according to an embodiment. An algorithm such as that illustrated by pseudocode 740 is performed, for example, with execution unit 190.

As shown in FIG. 7E (see line 1 of pseudocode 740), execution of the SEAMEXIT instruction is conditioned upon a setting of the flag inP_SEAMLDER which corresponds to the logical processor that provides the SEAMEXIT instruction in question. The SEAMEXIT execution flow (see lines 2 and 3 of pseudocode 740) flushes various TLBs, VMCSs and/or other data structures to return processor state from that of a secure authentication mode. Subsequently, the mutual exclusion lock is released, and the corresponding flag inP_SEAMLDR is cleared to indicate that the logical processor is not currently accessing P-SEAMLDR.

The figures described herein detail exemplary architectures and systems to implement embodiments of the above. In some embodiments, one or more hardware components and/or instructions described herein are emulated as detailed below, or implemented as software modules.

Embodiments of the instruction(s) detailed above are embodied may be embodied in a "generic vector friendly instruction format" which is detailed herein. In other embodiments, such a format is not utilized and another instruction format is used, however, the description herein of the writemask registers, various data transformations (swizzle, broadcast, etc.), addressing, etc. is generally applicable to the description of the embodiments of the instruction(s) above. Additionally, exemplary systems, architectures, and pipelines are detailed herein. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed herein. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
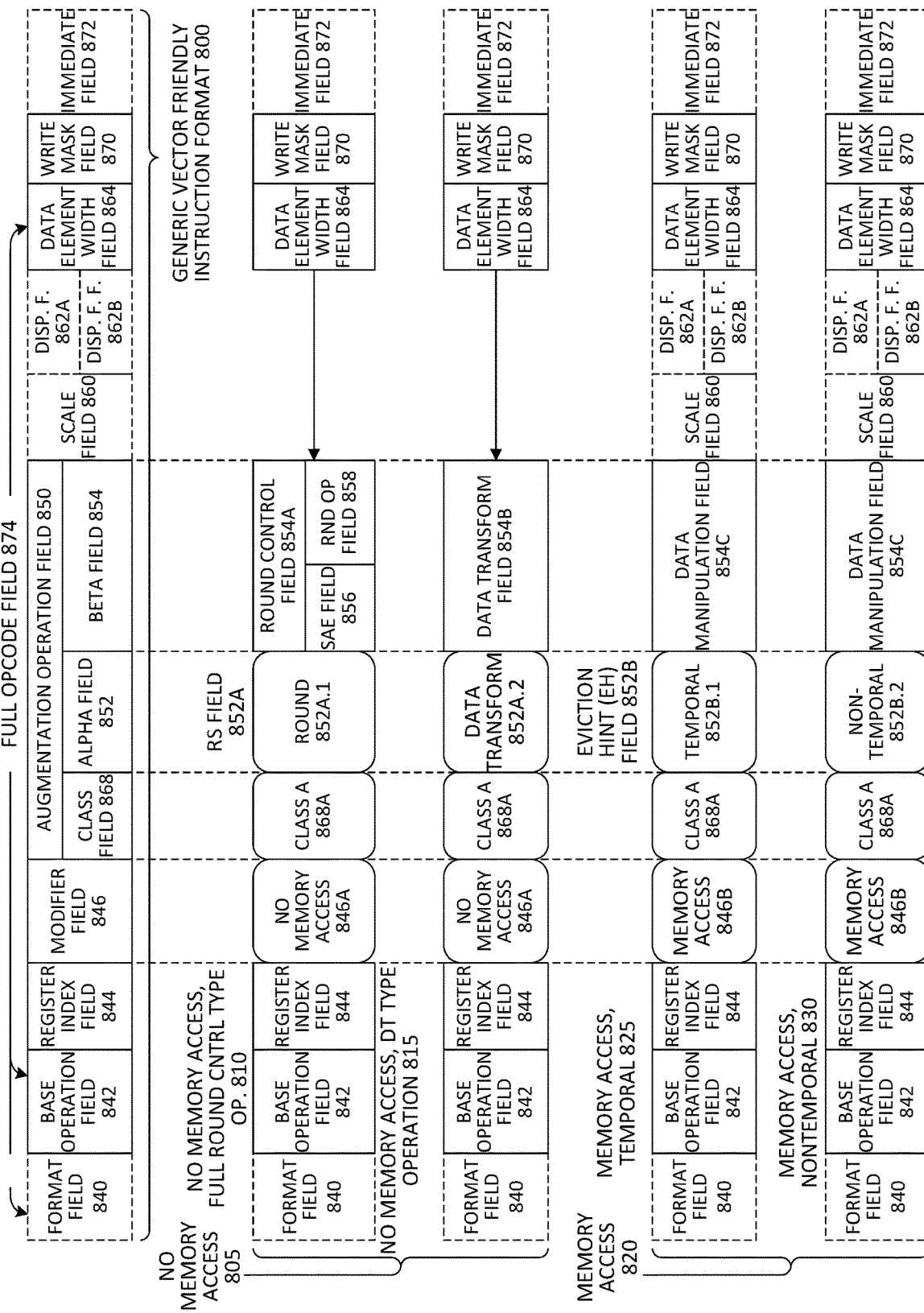
FIGS. 8A through 8B are block diagrams illustrating a generic vector friendly instruction format and instruction templates thereof according to an embodiment.
Figure 8B:
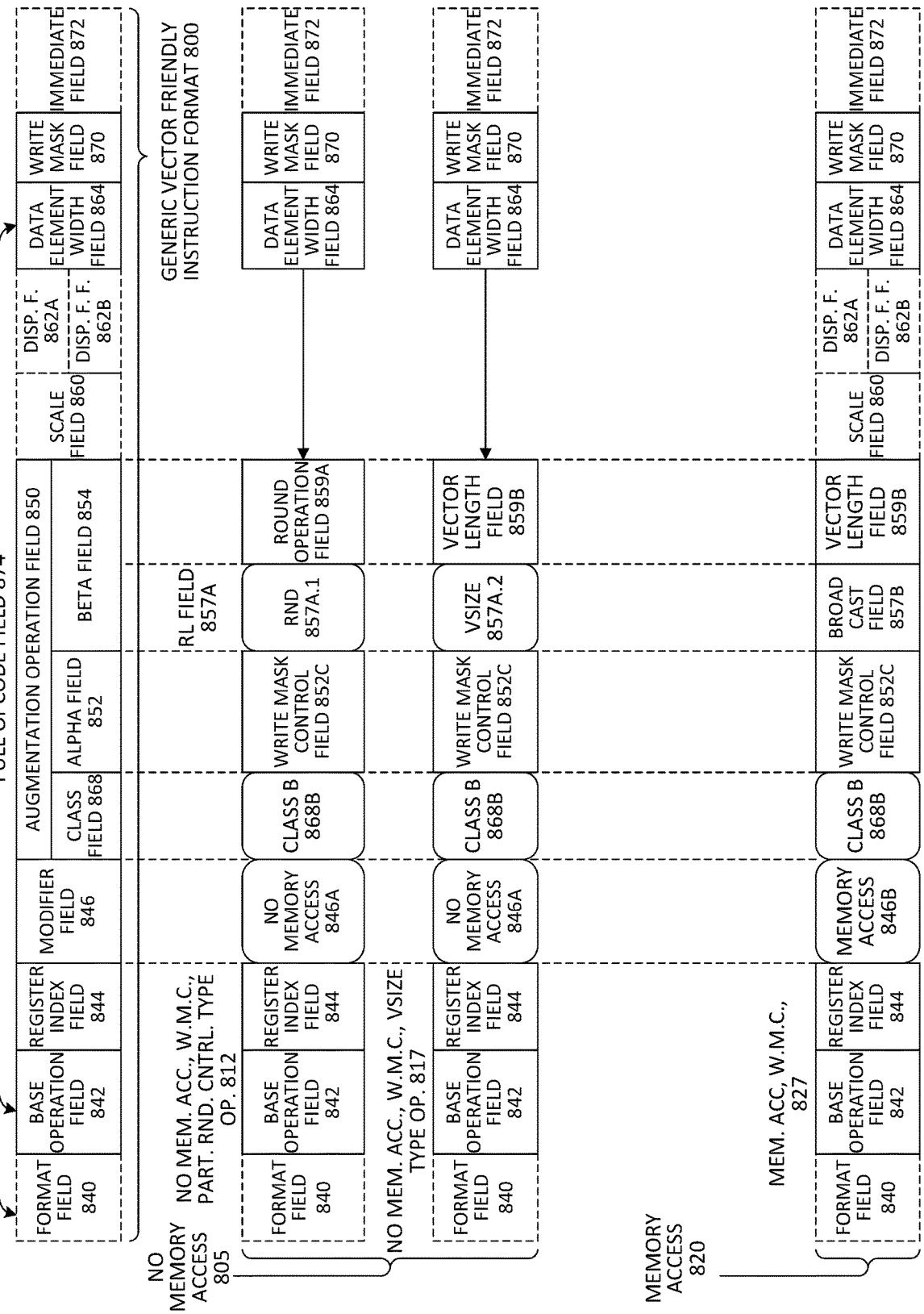

FIGS. 8A through 8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed herein in the order illustrated in FIGS. 8A through 8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates (e.g., no memory access 846A and memory access 846B for the class field 846 respectively in FIGS. 8A-B). Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses 2scale*index+base).

Displacement Field 862A—its content is used as part of memory address generation (e.g., for address generation that uses 2scale*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the write mask field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access

805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 858 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 812 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 858 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the invention. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The specific vector friendly instruction format 900 includes the following fields listed herein in the order illustrated in FIG. 9A.

EVEX Prefix (Bytes 0-3) 902—is encoded in a four-byte form.

Format Field 840 (EVEX Byte 0, bits [7:0]—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In one embodiment of the invention, this bit, along with others as indicated herein, is stored in bit inverted format to distinguish (in the well-known x86 32-bit mode) from the BOUND instruction, whose real opcode byte is 62, but does not accept in the MOD RIM field (described herein) the value of 11 in the MOD field; alternative embodiments of the invention do not store this and the other indicated bits herein in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.0 868 Class field (EVEX byte 2, bit [2]-U)—If EVEX.U=0, it indicates class A or EVEX.U0; if EVEX.U=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte 950 (Byte 6)—As previously described, the scale field's 860 content is used for memory address generation. SIB.SS 952, SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
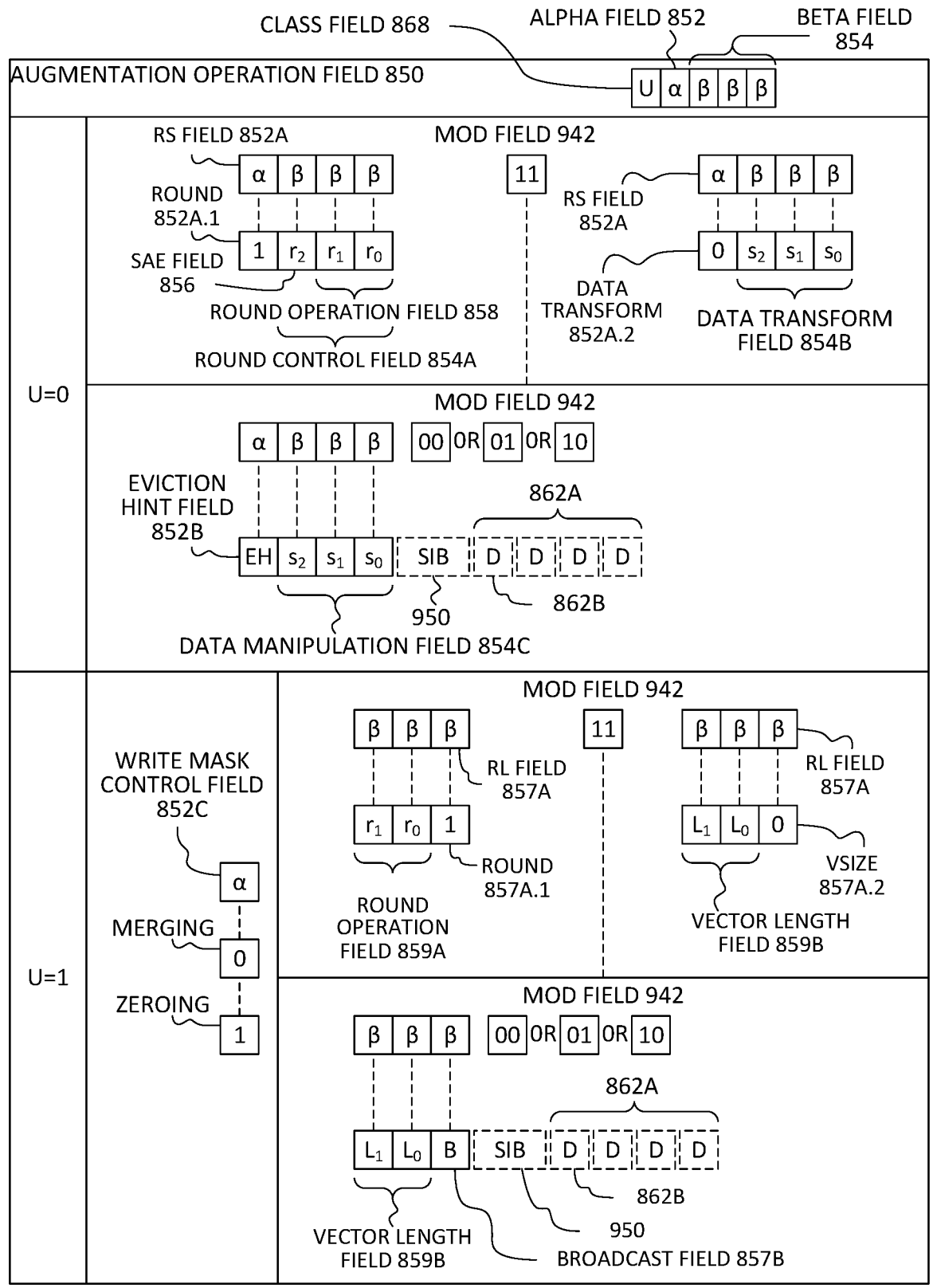

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]-EH) is interpreted as the rs field 852A. When the rs field 852A contains a 1 (round 852A.1), the beta field 854 (EVEX byte 3, bits [6:4]-SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]- SSS) is interpreted as a three bit data transform field 854B. When U=0 and the MOD field 942 contains 00, 01, or 10 (signifying a memory access operation), the alpha field 852 (EVEX byte 3, bit [7]-EH) is interpreted as the eviction hint (EH) field 852B and the beta field 854 (EVEX byte 3, bits [6:4]-SSS) is interpreted as a three bit data manipulation field 854C.

When U=1, the alpha field 852 (EVEX byte 3, bit [7]-EH) is interpreted as the write mask control (Z) field 852C. When U=1 and the MOD field 942 contains 11 (signifying a no memory access operation), part of the beta field 854 (EVEX byte 3, bit [4]-S0) is interpreted as the RL field 857A; when it contains a 1 (round 857A.1) the rest of the beta field 854 (EVEX byte 3, bit [6-5]-S2-1) is interpreted as the round operation field 859A, while when the RL field 857A contains a 0 (VSIZE 857.A2) the rest of the beta field 854 (EVEX byte 3, bit [6-5]-S2-1) is interpreted as the vector length field 859B (EVEX byte 3, bit [6-5]-L1-0). When U=1 and the MOD field 942 contains 00, 01, or 10 (signifying a memory access operation), the beta field 854 (EVEX byte 3, bits [6:4]-SSS) is interpreted as the vector length field 859B (EVEX byte 3, bit [6-5]-L1-0) and the broadcast field 857B (EVEX byte 3, bit [4]-B).

Exemplary Register Architecture

Figure 10:
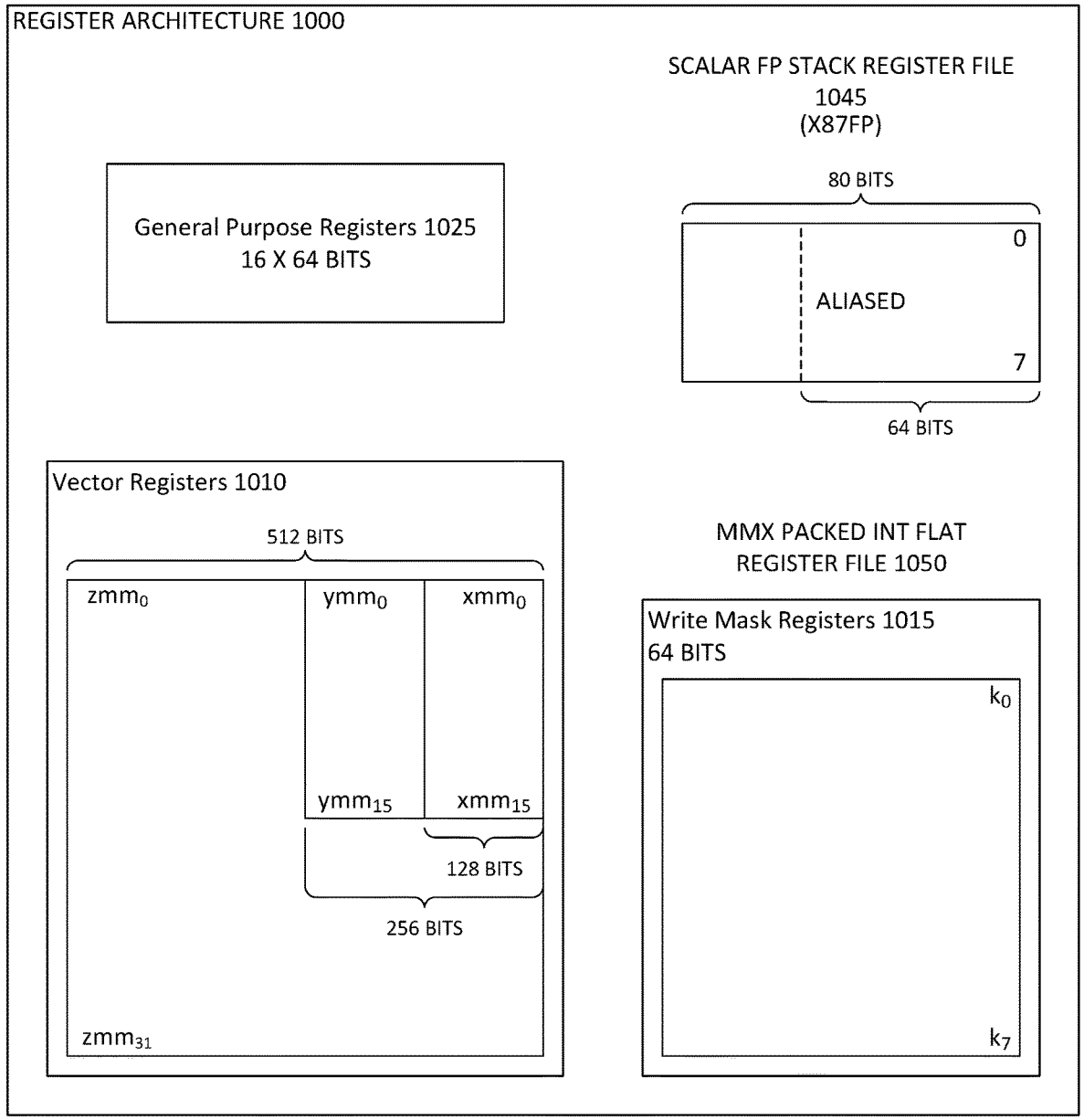
FIG. 10 is a block diagram of a register architecture according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
| --- | --- | --- | --- |
| Instruction Templates that do not include the vector length field 859B | A (FIG. 8A; U = 0) | 810, 815, 825, 830 | zmm registers (the vector length is 64 byte) |
|  | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-oforder issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12A:
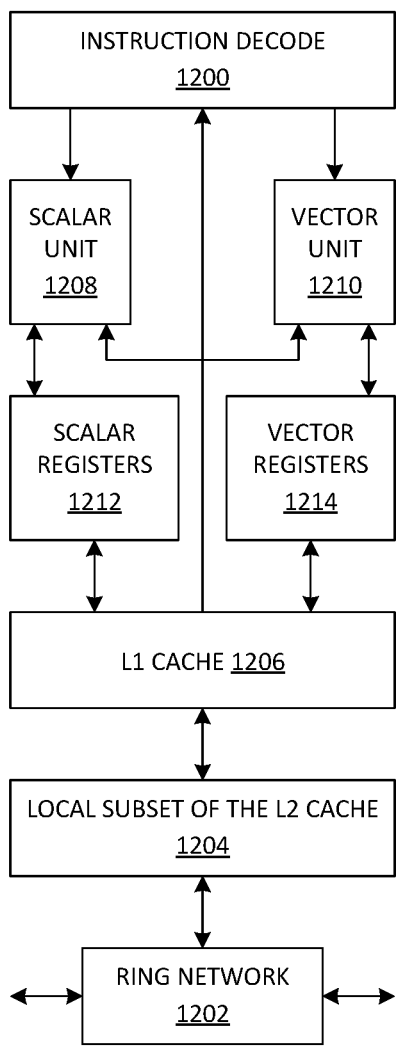
FIGS. 12A through 12B illustrate a block diagram of a more specific exemplary in-order core architecture, which core would be one of several logic blocks (including other cores of the same type and/or different types) in a chip.
Figure 12B:
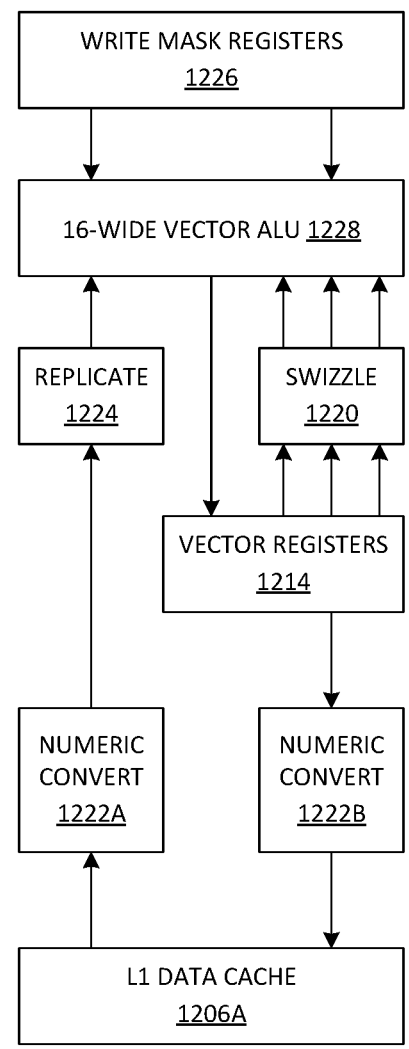

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O Oces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with 1 packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1206, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
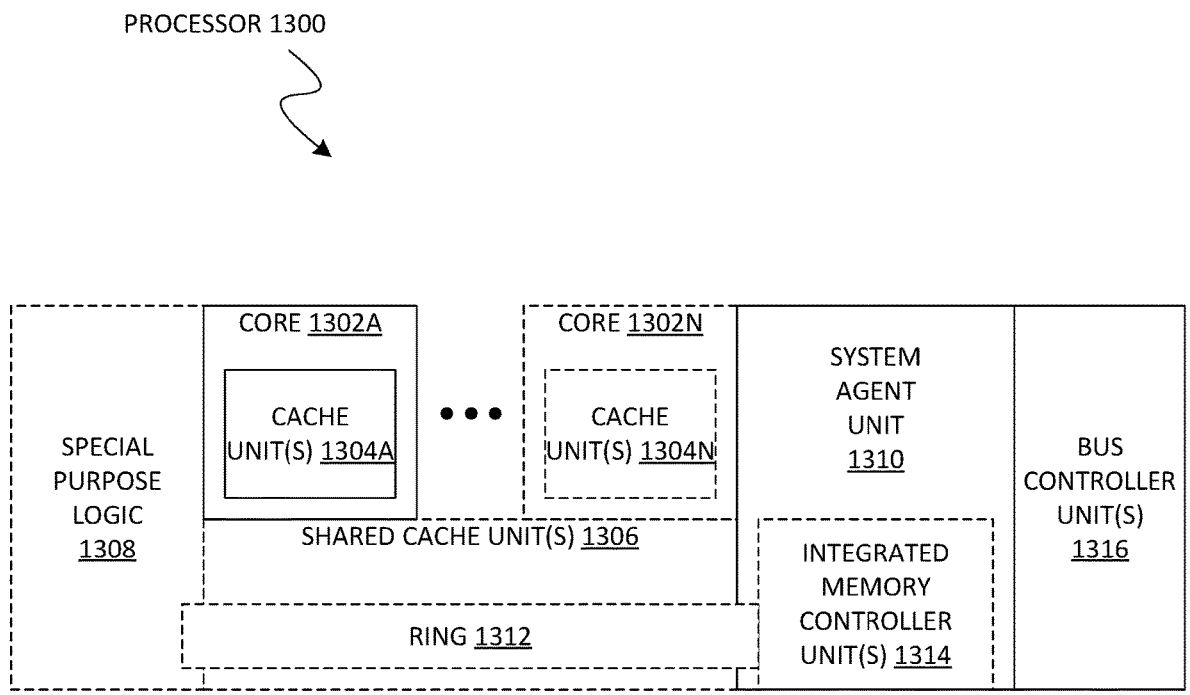
FIG. 13 is a block diagram of a processor that may have more than one core, may have an integrated memory controller, and may have integrated graphics according to an embodiment.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes respective one or more levels of caches 1304A-N within cores 1302A-N, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the special purpose logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14 through 17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
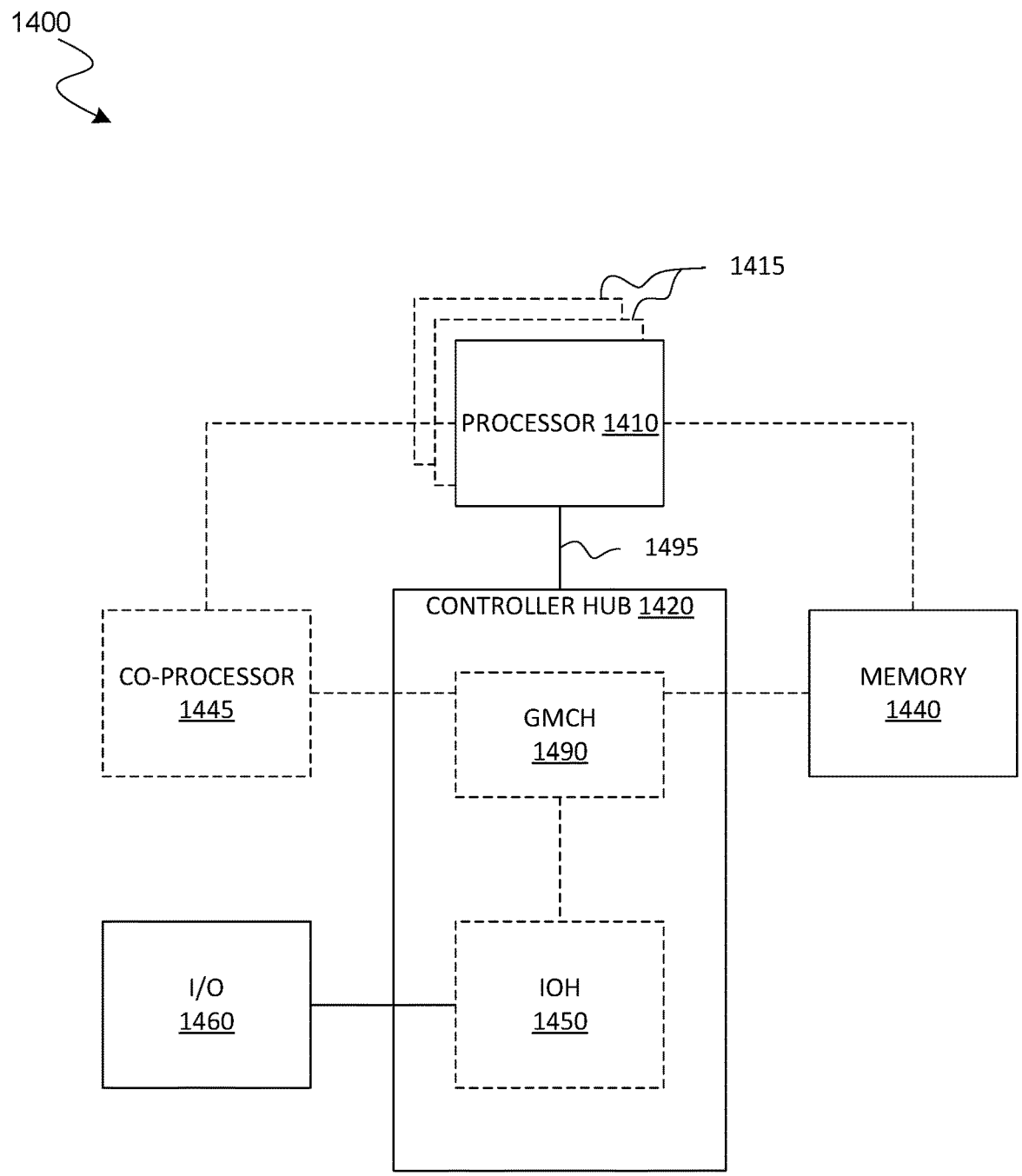
FIGS. 14 through 17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the processors 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
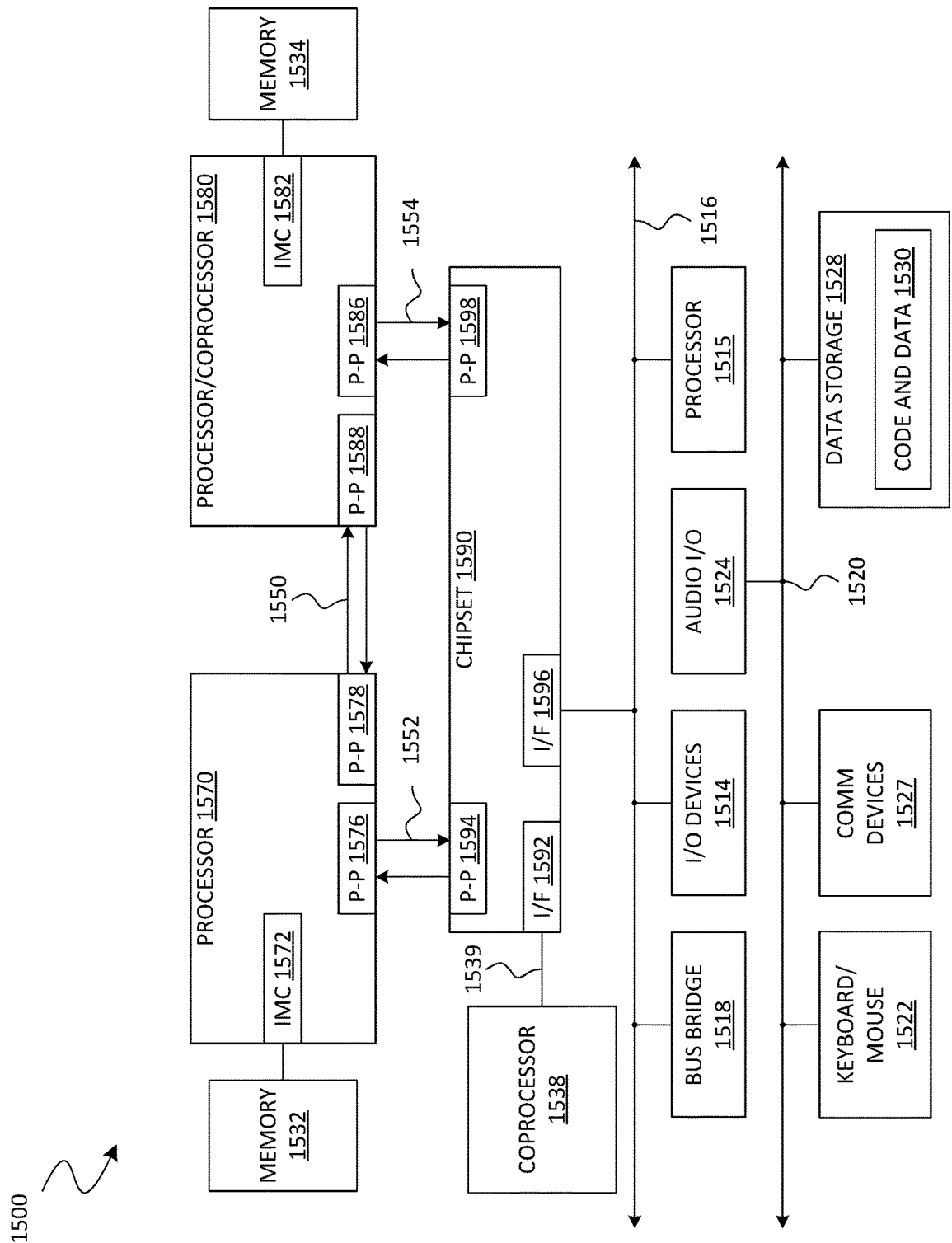

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller unit's point-to-point (P-P) interfaces 1576 and 1578; similarly, second processor 1580 includes P-P interfaces 1586 and 1588. Processors 1570, 1580 may exchange information via a point-to-point (P-P) interconnect 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592 and an interconnect 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment.

Further, an audio I/O 1524 may be coupled to the second bus 1520. Note that other architectures are possible. For example, instead of the point-to-point architecture of FIG. 15, a system may implement a multi-drop bus or other such architecture.

Figure 16:
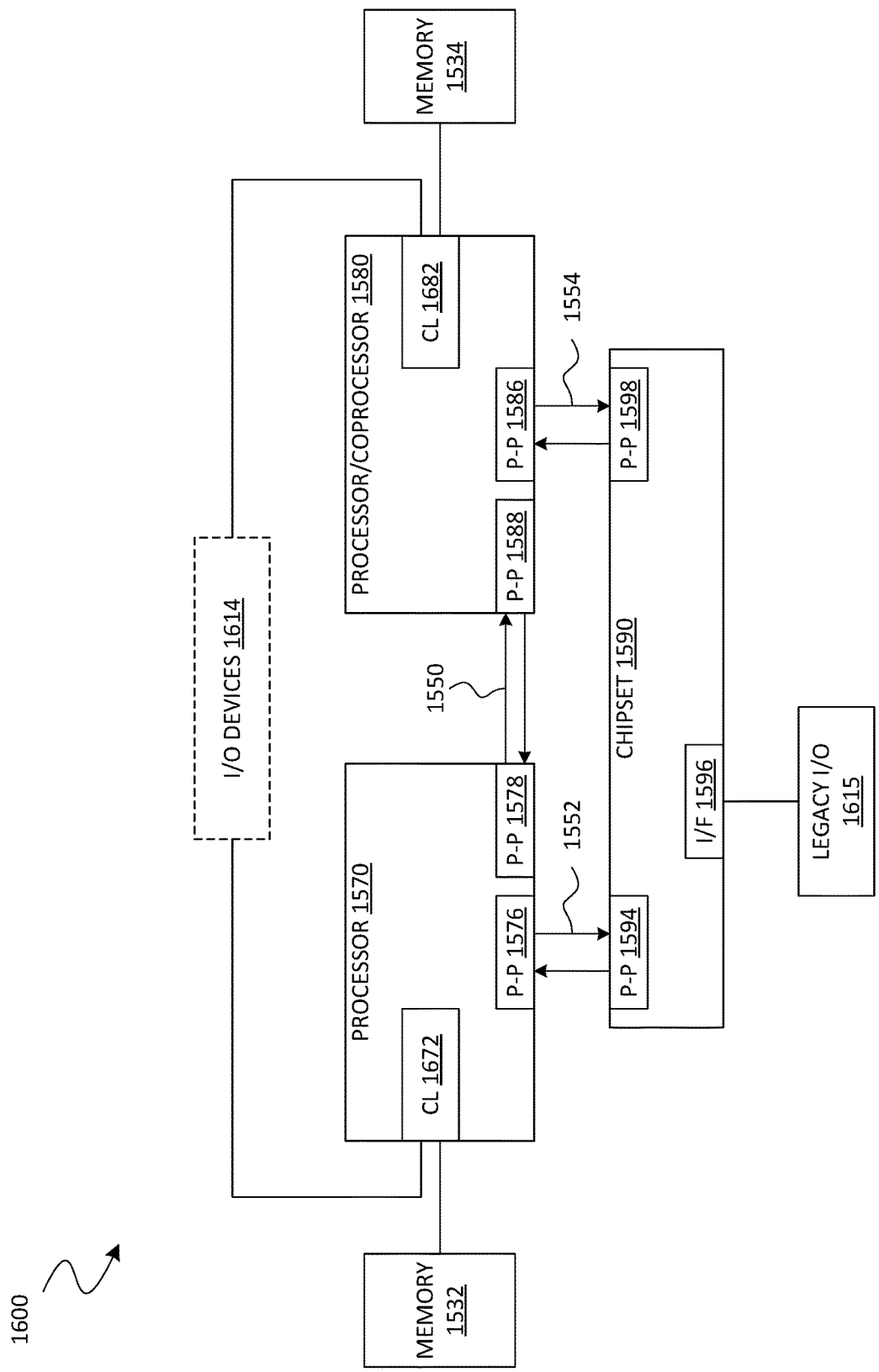

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1672 and 1682, respectively. Thus, the CL 1672, 1682 include integrated memory controller units and include I/O control logic. FIG. 16 illustrates that not only are the memories 1532, 1534 coupled to the CL 1672, 1682, but also that I/O devices 1614 are also coupled to the control logic 1672, 1682. Legacy I/O devices 1615 are coupled to the chipset 1590.

Figure 17:
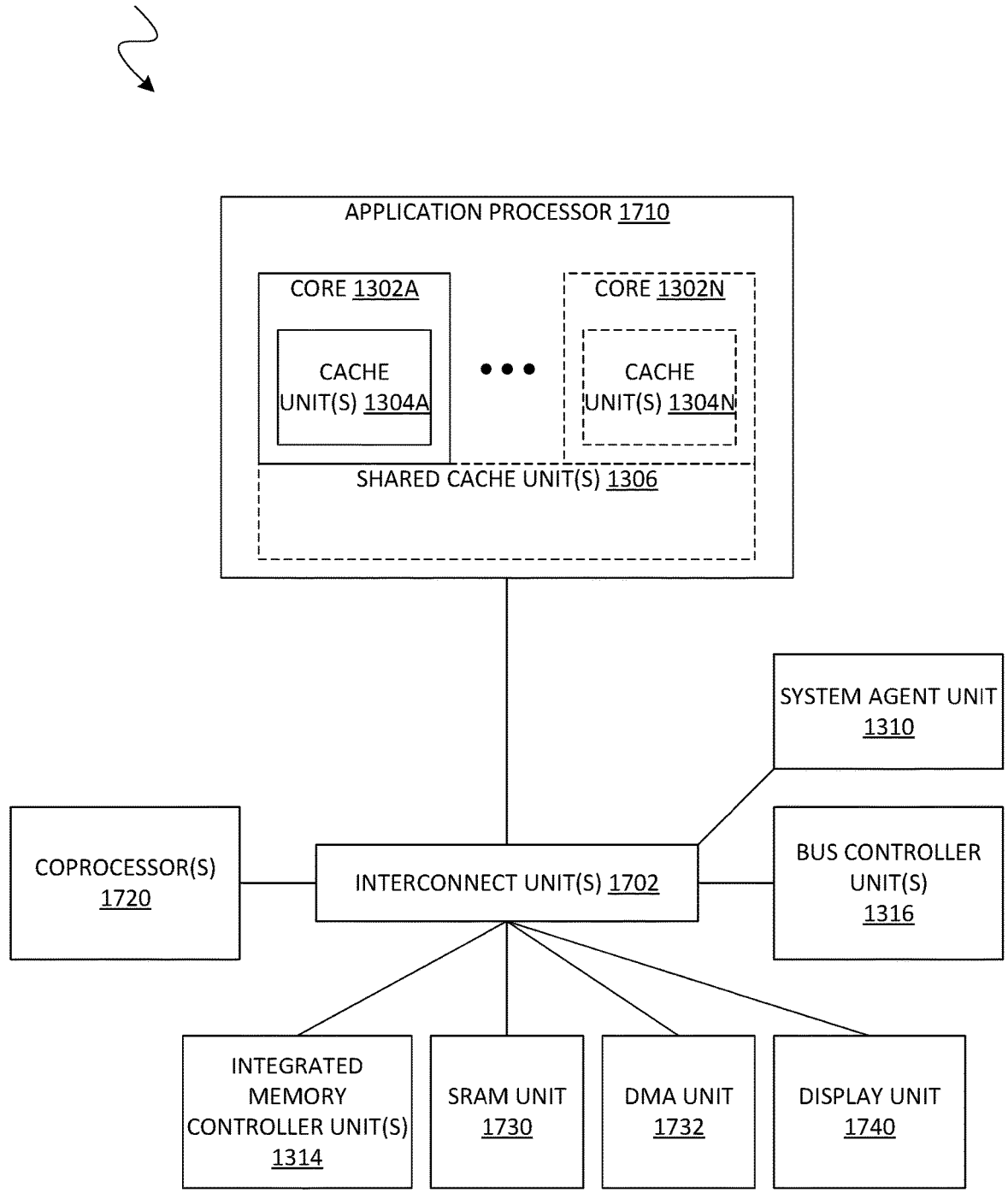

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
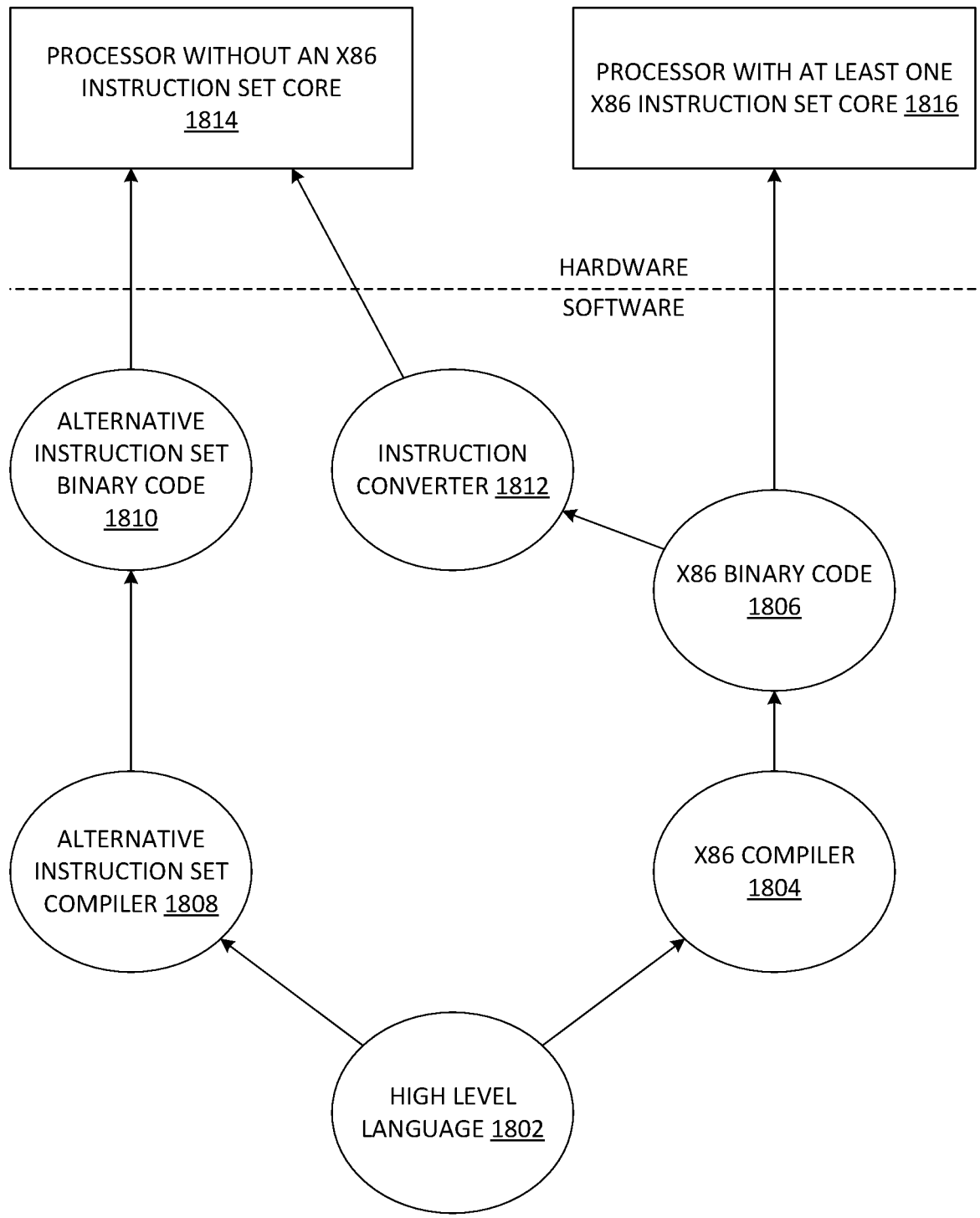
FIG. 18 is a block diagram contrasting the use of a software instruction converter to convert binary instructions in a source instruction set to binary instructions in a target instruction set according to an embodiment.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

In one or more first embodiments, a processor comprises a decoder comprising circuitry to decode a secure arbitration mode (SEAM) call (SEAMCALL) instruction based on an instruction set, the SEAMCALL instruction comprising a first field to provide an opcode to indicate that a logical processor is to transition from a legacy Virtual Machines Extension (VMX) root operation, and a second field to provide an operand to specify one of a SEAM loader module to be loaded in a reserved range of a system memory to be coupled to the processor, wherein a range register of the processor is to store information that identifies the reserved range, or a SEAM module to be loaded in the reserved range by the SEAM loader module, the SEAM module to initiate a SEAM of the processor, and execution circuitry, coupled to the decoder, to execute the SEAMCALL instruction, wherein the execution circuitry is to determine whether to access the one of the SEAM loader module or the SEAM module based on the operand.

In one or more second embodiments, further to the first embodiment, the execution circuitry to determine whether to access the one of the SEAM loader module or the SEAM module comprises the execution circuitry to determine whether to signal a failure of the SEAMCALL instruction based on a determination as to whether the operand specifies the SEAM module while a first variable (SEAM_READY) identifies an availability of the SEAM module, the first variable other than a second variable (P_SEAMLDR_READY) which is to identify whether the SEAM loader module is available.

In one or more third embodiments, further to the first embodiment or the second embodiment, the execution circuitry to determine whether to access the one of the SEAM loader module or the SEAM module comprises the execution circuitry to determine whether a mutual exclusion lock has been obtained, wherein the mutual exclusion lock is to be shared among multiple logical processors.

In one or more fourth embodiments, further to any of the first through third embodiments, the execution circuitry to execute the SEAMCALL instruction further comprises the execution circuitry to determine that the operand specifies the SEAM loader module, and set a first variable (inP_SEAMLDR), based on the operand, to indicate that, of the SEAM loader module and the SEAM module, the SEAM loader module is more recently invoked by the logical processor, wherein, of multiple logical processors to be provided with the processor, the first variable corresponds to only the logical processor.

In one or more fifth embodiments, further to the fourth embodiment, the processor further comprises a translation lookaside buffer (TLB), wherein the execution circuitry is further to execute a SEAM retirement (SEAMRET) instruction based on the instruction set, including the execution circuitry to determine, based on the first variable, whether to flush the TLB.

In one or more sixth embodiments, further to any of the first through third embodiments, the processor further comprises measurement registers, wherein the execution circuitry to execute the SEAMCALL instruction comprises the execution circuitry to invoke an execution of the SEAM loader module to write to the measurement registers a measurement of the SEAM module.

In one or more seventh embodiments, a system comprises a memory, and a processor coupled to the memory, the processor comprising a decoder comprising circuitry to decode a secure arbitration mode (SEAM) call (SEAMCALL) instruction based on an instruction set, the SEAMCALL instruction comprising a first field to provide an opcode to indicate that a logical processor is to transition from a legacy Virtual Machines Extension (VMX) root operation, and a second field to provide an operand to specify one of a SEAM loader module to be loaded in a reserved range of the memory, wherein a range register of the processor is to store information that identifies the reserved range, or a SEAM module to be loaded in the reserved range by the SEAM loader module, the SEAM module to initiate a SEAM of the processor, and execution circuitry, coupled to the decoder, to execute the SEAMCALL instruction, wherein the execution circuitry is to determine whether to access the one of the SEAM loader module or the SEAM module based on the operand.

In one or more eighth embodiments, further to the seventh embodiment, the execution circuitry to determine whether to access the one of the SEAM loader module or the SEAM module comprises the execution circuitry to determine whether to signal a failure of the SEAMCALL instruction based on a determination as to whether the operand specifies the SEAM module while a first variable (SEAM_READY) identifies an availability of the SEAM module, the first variable other than a second variable (P_SEAMLDR_READY) which is to identify whether the SEAM loader module is available.

In one or more ninth embodiments, further to the seventh embodiment or the eighth embodiment, the execution circuitry to determine whether to access the one of the SEAM loader module or the SEAM module comprises the execution circuitry to determine whether a mutual exclusion lock has been obtained, wherein the mutual exclusion lock is to be shared among multiple logical processors.

In one or more tenth embodiments, further to any of the seventh through ninth embodiments, the execution circuitry to execute the SEAMCALL instruction further comprises the execution circuitry to determine that the operand specifies the SEAM loader module, and set a first variable (inP_SEAMLDR), based on the operand, to indicate that, of the SEAM loader module and the SEAM module, the SEAM loader module is more recently invoked by the logical processor, wherein, of multiple logical processors to be provided with the processor, the first variable corresponds to only the logical processor.

In one or more eleventh embodiments, further to the tenth embodiment, the processor further comprises a translation lookaside buffer (TLB), wherein the execution circuitry is further to execute a SEAM retirement (SEAMRET) instruction based on the instruction set, including the execution circuitry to determine, based on the first variable, whether to flush the TLB.

In one or more twelfth embodiments, further to any of the seventh through ninth embodiments, processor further comprises measurement registers, wherein the execution circuitry to execute the SEAMCALL instruction comprises the execution circuitry to invoke an execution of the SEAM loader module to write to the measurement registers a measurement of the SEAM module.

In one or more thirteenth embodiments, one or more non-transitory computer-readable storage media have stored thereon instructions which, when executed by one or more processing units, cause a core of a processor to perform a method comprising decoding a secure arbitration mode (SEAM) call (SEAMCALL) instruction based on an instruction set, the SEAMCALL instruction comprising a first field to provide an opcode to indicate that a logical processor is to transition from a legacy Virtual Machines Extension (VMX) root operation, and a second field to provide an operand to specify one of a SEAM loader module loaded in a reserved range of a system memory coupled to the processor, wherein a range register of the processor is to store information that identifies the reserved range, or a SEAM module loaded in the reserved range by the SEAM loader module, the SEAM module to initiate a SEAM of the processor, and executing the SEAMCALL instruction, including determining whether to access the one of the SEAM loader module or the SEAM module based on the operand.

In one or more fourteenth embodiments, further to the thirteenth embodiment, the method further comprises launching an authenticated code module (ACM) at the processor, and with the ACM, loading the SEAM loader module in the reserved range.

In one or more fifteenth embodiments, further to the fourteenth embodiment, the method further comprises invoking an execution of the SEAM loader module to load the SEAM module in the reserved range.

In one or more sixteenth embodiments, further to the thirteenth embodiment or the fourteenth embodiment, determining whether to access the one of the SEAM loader module or the SEAM module comprises determining whether to signal a failure of the SEAMCALL instruction based on a determination as to whether the operand specifies the SEAM module while a first variable (SEAM_READY) identifies an availability of the SEAM module, the first variable other than a second variable (P_SEAMLDR_READY) which identifies whether the SEAM loader module is available.

In one or more seventeenth embodiments, further to any of the thirteenth through fourteenth embodiments, determining whether to access the one of the SEAM loader module or the SEAM module comprises determining whether a mutual exclusion lock has been obtained, wherein the mutual exclusion lock is shared among multiple logical processors.

In one or more eighteenth embodiments, further to any of the thirteenth through fourteenth embodiments, executing the SEAMCALL instruction further comprises determining that the operand specifies the SEAM loader module, and setting a first variable (inP_SEAMLDR), based on the operand, to indicate that, of the SEAM loader module and the SEAM module, the SEAM loader module is more recently invoked by the logical processor, wherein, of multiple logical processors provided with the processor, the first variable corresponds to only the logical processor.

In one or more nineteenth embodiments, further to the eighteenth embodiment, the processor comprises a translation lookaside buffer (TLB), and the method further comprises executing a SEAM retirement (SEAMRET) instruction based on the instruction set, including determining, based on the first variable, whether to flush the TLB.

In one or more twentieth embodiments, further to any of the thirteenth through fourteenth embodiments, the processor further comprises measurement registers, wherein executing the SEAMCALL instruction comprises invoking an execution of the SEAM loader module to write to the measurement registers a measurement of the SEAM module.

In one or more twenty-first embodiments, a method at a processor, the method comprises decoding a secure arbitration mode (SEAM) call (SEAMCALL) instruction based on an instruction set, the SEAMCALL instruction comprising a first field to provide an opcode to indicate that a logical processor is to transition from a legacy Virtual Machines Extension (VMX) root operation, and a second field to provide an operand to specify one of a SEAM loader module loaded in a reserved range of a system memory coupled to the processor, wherein a range register of the processor is to store information that identifies the reserved range, or a SEAM module loaded in the reserved range by the SEAM loader module, the SEAM module to initiate a SEAM of the processor, and executing the SEAMCALL instruction, including determining whether to access the one of the SEAM loader module or the SEAM module based on the operand.

In one or more twenty-second embodiments, further to the twenty-first embodiment, the method further comprises launching an authenticated code module (ACM) at the processor, and with the ACM, loading the SEAM loader module in the reserved range.

In one or more twenty-third embodiments, further to the twenty-second embodiment, the method further comprises invoking an execution of the SEAM loader module to load the SEAM module in the reserved range.

In one or more twenty-fourth embodiments, further to the twenty-first embodiment or the twenty-second embodiment, determining whether to access the one of the SEAM loader module or the SEAM module comprises determining whether to signal a failure of the SEAMCALL instruction based on a determination as to whether the operand specifies the SEAM module while a first variable (SEAM_READY) identifies an availability of the SEAM module, the first variable other than a second variable (P_SEAMLDR_READY) which identifies whether the SEAM loader module is available.

In one or more twenty-fifth embodiments, further to any of the twenty-first through twenty-second embodiments, determining whether to access the one of the SEAM loader module or the SEAM module comprises determining whether a mutual exclusion lock has been obtained, wherein the mutual exclusion lock is shared among multiple logical processors.

In one or more twenty-sixth embodiments, further to any of the twenty-first through twenty-second embodiments, executing the SEAMCALL instruction further comprises determining that the operand specifies the SEAM loader module, and setting a first variable (inP_SEAMLDR), based on the operand, to indicate that, of the SEAM loader module and the SEAM module, the SEAM loader module is more recently invoked by the logical processor, wherein, of multiple logical processors provided with the processor, the first variable corresponds to only the logical processor.

In one or more twenty-seventh embodiments, further to the twenty-sixth embodiment, the processor comprises a translation lookaside buffer (TLB), and the method further comprises executing a SEAM retirement (SEAMRET) instruction based on the instruction set, including determining, based on the first variable, whether to flush the TLB.

In one or more twenty-eighth embodiments, further to any of the twenty-first through twenty-second embodiments, the processor further comprises measurement registers, wherein executing the SEAMCALL instruction comprises invoking an execution of the SEAM loader module to write to the measurement registers a measurement of the SEAM module.

Techniques and architectures for providing security of trusted domains are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
   a decoder comprising circuitry to decode a secure arbitration mode (SEAM) call (SEAMCALL) instruction based on an instruction set, the SEAMCALL instruction comprising a first field to provide an opcode to indicate that a logical processor is to transition from a legacy Virtual Machines Extension root operation; and
   execution circuitry, coupled to the decoder, to execute the SEAMCALL instruction, comprising the execution circuitry to identify an operand which, according to the instruction set, is to specify either one of:
      a SEAM loader module to be loaded in a reserved range of a system memory to be coupled to the processor, wherein a range register of the processor is to store information that identifies the reserved range; or
      a SEAM module to be loaded in the reserved range by the SEAM loader module, the SEAM module to initiate a SEAM of the processor;
   wherein:
      where the operand is equal to a first value, the execution circuitry is to access the SEAM loader module; and
      where the operand is equal to a second value, the execution circuitry is instead to access the SEAM module.

2. The processor of claim 1, wherein the execution circuitry is to determine whether to access one of the SEAM loader module or the SEAM module, comprising the execution circuitry to determine whether to signal a failure of the SEAMCALL instruction based on a determination as to whether the operand specifies the SEAM module while a first variable identifies an availability of the SEAM module, the first variable other than a second variable which is to identify whether the SEAM loader module is available.

3. The processor of claim 1, wherein the execution circuitry is to determine whether to access one of the SEAM loader module or the SEAM module, comprising the execution circuitry to determine whether a mutual exclusion lock has been obtained, wherein the mutual exclusion lock is to be shared among multiple logical processors.

4. The processor of claim 1, wherein the execution circuitry to execute the SEAMCALL instruction further comprises the execution circuitry to:
- determine that the operand specifies the SEAM loader module; and
- set a first variable, based on the operand, to indicate that, of the SEAM loader module and the SEAM module, the SEAM loader module is more recently invoked by the logical processor, wherein, of multiple logical processors to be provided with the processor, the first variable corresponds to only the logical processor.

5. The processor of claim 4, further comprising a translation lookaside buffer (TLB), wherein the execution circuitry is further to execute a SEAM retirement instruction based on the instruction set, including the execution circuitry to determine, based on the first variable, whether to flush the TLB.

6. The processor of claim 1, further comprising measurement registers, wherein the execution circuitry to execute the SEAMCALL instruction comprises the execution circuitry to invoke an execution of the SEAM loader module to write to the measurement registers a measurement of the SEAM module.

7. A system comprising:
- a memory; and
- a processor coupled to the memory, the processor comprising:
  - a decoder comprising circuitry to decode a secure arbitration mode (SEAM) call (SEAMCALL) instruction based on an instruction set, the SEAMCALL instruction comprising a first field to provide an opcode to indicate that a logical processor is to transition from a legacy Virtual Machines Extension root operation; and
  - execution circuitry, coupled to the decoder, to execute the SEAMCALL instruction, comprising the execution circuitry to identify an operand which, according to the instruction set, is to specify either one of:
    - a SEAM loader module to be loaded in a reserved range of the memory, wherein a range register of the processor is to store information that identifies the reserved range; or
    - a SEAM module to be loaded in the reserved range by the SEAM loader module, the SEAM module to initiate a SEAM of the processor; and
  - wherein:
    - where the operand is equal to a first value, the execution circuitry is to access the SEAM loader module; and
    - where the operand is equal to a second value, the execution circuitry is instead to access the SEAM module.

8. The system of claim 7, wherein the execution circuitry is to determine whether to access one of the SEAM loader module or the SEAM module, comprising the execution circuitry to determine whether to signal a failure of the SEAMCALL instruction based on a determination as to whether the operand specifies the SEAM module while a first variable identifies an availability of the SEAM module, the first variable other than a second variable which is to identify whether the SEAM loader module is available.

9. The system of claim 7, wherein the execution circuitry is to determine whether to access one of the SEAM loader module or the SEAM module, comprising the execution circuitry to determine whether a mutual exclusion lock has been obtained, wherein the mutual exclusion lock is to be shared among multiple logical processors.

10. The system of claim 7, wherein the execution circuitry to execute the SEAMCALL instruction further comprises the execution circuitry to:
- determine that the operand specifies the SEAM loader module; and
- set a first variable, based on the operand, to indicate that, of the SEAM loader module and the SEAM module, the SEAM loader module is more recently invoked by the logical processor, wherein, of multiple logical processors to be provided with the processor, the first variable corresponds to only the logical processor.

11. The system of claim 10, wherein a general purpose register of the processor is to provide the operand.

12. The system of claim 7, the processor further comprising measurement registers, wherein the execution circuitry to execute the SEAMCALL instruction comprises the execution circuitry to invoke an execution of the SEAM loader module to write to the measurement registers a measurement of the SEAM module.

13. One or more non-transitory computer-readable storage media having stored thereon instructions which, when executed by one or more processing units, cause a core of a processor to perform a method comprising:
- decoding a secure arbitration mode (SEAM) call (SEAMCALL) instruction based on an instruction set, the SEAMCALL instruction comprising a first field to provide an opcode to indicate that a logical processor is to transition from a legacy Virtual Machines Extension root operation;
- executing the SEAMCALL instruction, comprising:
  - identifying an operand which, according to the instruction set, is to specify either one of:
    - a SEAM loader module loaded in a reserved range of a system memory coupled to the processor, wherein a range register of the processor is to store information that identifies the reserved range; or
    - a SEAM module loaded in the reserved range by the SEAM loader module, the SEAM module to initiate a SEAM of the processor;
  - where the operand is equal to a first value, accessing the SEAM loader module; and
  - where the operand is equal to a second value, accessing the SEAM module based on the operand.

14. The one or more computer-readable storage media of claim 13, the method further comprising:
- launching an authenticated code module (ACM) at the processor; and
- with the ACM, loading the SEAM loader module in the reserved range.

15. The one or more computer-readable storage media of claim 14, the method further comprising:
- invoking an execution of the SEAM loader module to load the SEAM module in the reserved range.

16. The one or more computer-readable storage media of claim 13, wherein the executing the SEAMCALL instruction comprises:
- determining whether to access the one of the SEAM loader module or the SEAM module, comprising determining whether to signal a failure of the SEAMCALL instruction based on a determination as to whether the operand specifies the SEAM module while a first variable identifies an availability of the SEAM module, the first variable other than a second variable which identifies whether the SEAM loader module is available.

17. The one or more computer-readable storage media of claim 13, wherein the executing the SEAMCALL instruction comprises:
  determining whether to access the one of the SEAM loader module or the SEAM module, comprising determining whether a mutual exclusion lock has been obtained, wherein the mutual exclusion lock is shared among multiple logical processors.

18. The one or more computer-readable storage media of claim 13, wherein executing the SEAMCALL instruction further comprises:
  determining that the operand specifies the SEAM loader module; and
  setting a first variable, based on the operand, to indicate that, of the SEAM loader module and the SEAM module, the SEAM loader module is more recently invoked by the logical processor, wherein, of multiple logical processors provided with the processor, the first variable corresponds to only the logical processor.

19. The one or more computer-readable storage media of claim 18, wherein the processor comprises a translation lookaside buffer (TLB), the method further comprising:
  executing a SEAM retirement instruction based on the instruction set, including determining, based on the first variable, whether to flush the TLB.

20. The one or more computer-readable storage media of claim 13, wherein the processor further comprises measurement registers, wherein executing the SEAMCALL instruction comprises invoking an execution of the SEAM loader module to write to the measurement registers a measurement of the SEAM module.

\* \* \* \* \*